United States Patent
Kato et al.

(10) Patent No.: US 7,396,573 B2
(45) Date of Patent: Jul. 8, 2008

(54) LIQUID CRYSTAL DISPLAY ELEMENT AND LIGHT-MODULATING MATERIAL

(75) Inventors: Takashi Kato, Kanagawa (JP); Koji Takaku, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/607,857

(22) Filed: Dec. 4, 2006

(65) Prior Publication Data

US 2007/0131903 A1 Jun. 14, 2007

(30) Foreign Application Priority Data

Dec. 9, 2005 (JP) ............... 2005-356376

(51) Int. Cl.
*C09K 19/60* (2006.01)
*C09K 19/52* (2006.01)
*G02F 1/13* (2006.01)

(52) U.S. Cl. ............... 428/1.3; 252/299.01; 252/299.1; 252/299.5; 252/582

(58) Field of Classification Search ............ 428/1.1, 428/1.3; 252/299.01, 299.1, 582, 299.5
See application file for complete search history.

(56) References Cited

U.S. PATENT DOCUMENTS

| 6,730,241 B2 * | 5/2004 | Obi et al. ............... 252/299.67 |
| 6,846,540 B2 * | 1/2005 | Yumoto et al. ............ 428/64.1 |
| 7,042,536 B2 * | 5/2006 | Hiji et al. ............... 349/98 |
| 2004/0232382 A1 * | 11/2004 | Okamura et al. ......... 252/299.5 |
| 2005/0072962 A1 * | 4/2005 | Takaku ............... 252/299.01 |
| 2005/0218376 A1 * | 10/2005 | Izumi ............... 252/299.01 |

FOREIGN PATENT DOCUMENTS

| JP | 2001-21924 | * | 7/1999 |
| JP | 2001-21924 A | | 1/2001 |

OTHER PUBLICATIONS

English translation by computer fro JP 2001-21924, http://www4.ipdl.inpit.go.jp/Tokujitu/PAJdetail.ipdl?N0000=60&N0120=01&N2001=2&N3001=2001-021924.*
J. Mater, Chem. vol. 12, p. 2197-2201, 2002.

* cited by examiner

*Primary Examiner*—Shean C Wu
(74) *Attorney, Agent, or Firm*—Birch, Stewart, Kolasch & Birch, LLP

(57) ABSTRACT

The invention provides a liquid crystal display element and a light-modulating material each containing at least one low molecular weight gelling agent, at least one dichroic dye having a substituent represented by formula (1) and at least one host liquid crystal between a pair of electrodes at least one of which is a transparent electrode. Representations in formula (1) are: Het, O or S; $B^1$ and $B^2$, divalent arylene, heteroarylene or alicyclic hydrocarbon group; $Q^1$, divalent linking group; $C^1$, alkyl, cycloalkyl, alkoxy, alkoxycarbonyl, acyl or acyloxy group; j, 0 or 1; p, q and r, an integer 0 to 5; n, an integer 1 to 3; and $(p+r) \times n$ is an integer 3 to 10.

$$-(Het)_j-[(B^1)_p-(Q^1)_q-(B^2)_r]_n-C^1 \qquad \text{Formula (1)}$$

16 Claims, No Drawings

LIQUID CRYSTAL DISPLAY ELEMENT AND LIGHT-MODULATING MATERIAL

CROSS-REFERENCE TO RELATED APPLICATION

This application claims priority under 35 USC 119 from Japanese Patent Application No. 2005-356376, the disclosure of which is incorporated by reference herein.

BACKGROUND OF THE INVENTION

1. Technical Field

The invention relates to a liquid crystal display element and a light-modulating material. In particular, the invention belongs to technical fields of a guest-host liquid crystal display element and a light-modulating material.

2. Description of the Related Art

With the spread of the digital technology, the importance of a display for displaying digital information (hereinafter referred to as "electronic paper") has been increasing. The performance required for the electronic paper includes a high visual recognition and low electric power consumption. High visual recognition means white background similar to paper, and hence a display method based on light-scattering white background similar to paper is suited. On the other hand, as to the electric power consumption, the reflection type display system has lower power consumption as compared with that of self light-emission display system. Many systems have been proposed so far for the electronic paper. Examples include a reflection type liquid crystal display system, electrophoresis display system, magnetophoresis display system, dichroic ball rotation system, electrochromic display system, and leucothermal system. Any of these methods is not satisfactory from the viewpoint of high visual recognition, and improvement therefore has been demanded.

The importance of light-modulating materials as environment-friendly materials has increased. Regarding the light-modulating materials, while light-modulating methods that have been investigated include, in addition to light and heat, modulation by stimulating with electrical modulation methods, but these methods are not yet at a satisfactory level, and further improvements are required.

While many display methods have been proposed for the liquid crystal display element, among the various methods a guest-host liquid crystal display element looks promising since bright display is possible with such an element and it is applicable to reflection display methods. A guest-host liquid crystal display element displays by placing a liquid crystal composition including a dichroic dye dissolved in a nematic liquid crystal into a cell and sealing it, applying an electric field, and changing the orientation of the dichroic dye in accordance with the movement of the liquid crystal by the electric field thereby changing the light absorption state of the cell. In guest-host liquid crystal display elements, different from in conventional liquid crystal display methods, since a driving method requiring no polarizer is possible, brighter displays may be expected. Examples of proposed guest-host methods using no polarizer, that is to say methods for realizing a light absorption state that are not dependent on polarized light, include a method taking advantage of a chiral nematic phase by a combination of a liquid crystal and a chiral reagent, and a polymer dispersion method (PDLC) taking advantage of complexing a liquid crystal with a polymer matrix. However, display performance of these methods is not at a satisfactory level, and improvements of the methods are required.

A liquid crystal composition to which a low molecular weight gelling agent is added has been disclosed for a liquid crystal display element comprising a nematic liquid crystal (for example, see J. Mater, Chem. Vol. 12, p 2197-2201, 2002). The patent publication describes that switching between scattering/transmission states is possible by gelling the nematic liquid crystal.

While a host-guest method using the low molecular weight gelling agent has been disclosed (for example, see Japanese Patent Application Laid-Open (JP-A) No. 2001-21924), display performance thereof is not at a satisfactory level yet.

SUMMARY OF THE INVENTION

The invention has been made in view of the above-mentioned situations and provides a liquid crystal display element having high display performance, and a light-modulating material having high light-modulating performance.

It has been difficult to obtain satisfactory display performance by guest-host methods using a nematic liquid crystal in which a conventional low molecular weight gelling agent and a conventional dichroic dye are used. It was particularly difficult to decrease absorption of dye in the transparent state. The inventors of the invention found, through intensive studies, that a guest-host method capable of yielding quite high performance can be realized by combining a dichroic dye having a specific manner of substitution and a low molecular weight gelling agent, and have completed the invention through further studies based on this discovery.

According to an aspect of the invention, there is provided a liquid crystal display element that is a layered member comprising: a liquid crystal layer, provided between a pair of electrodes, at least one of which being a transparent electrode, and the liquid crystal layer including at least one low molecular weight gelling agent, at least one dichroic dye having a substituent represented by formula (1) and at least one host liquid crystal; and a reflection layer; the liquid crystal display element displaying an image by reflecting incident light.

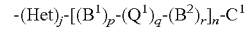

Formula (1)

In formula (1), Het represents an oxygen atom or a sulfur atom; $B^1$ and $B^2$ each independently represent a divalent arylene group, a heteroarylene group or a divalent alicyclic hydrocarbon group; $Q^1$ represents a divalent linking group; $C^1$ represents an alkyl group, a cycloalkyl group, an alkoxy group, an alkoxycarbonyl group, an acyl group or an acyloxy group; j represents 0 or 1; p, q and r each independently represent an integer of 0 to 5; n represents an integer of 1 to 3; (p+r)×n is an integer of 3 to 10; when p is 2 or larger, two or more groups represented by $B^1$ may be the same or different; when q is 2 or larger, two or more groups represented by $Q^1$ may be the same or different; when r is 2 or larger, two or more groups represented by $B^2$ may be the same or different; and when n is 2 or larger, two or more groups represented by $[(B^1)_p\text{-}(Q^1)_q\text{-}(B^2)_r]$ may be the same or different.

According to another aspect of the invention, there is provided a light-modulating material comprising; a liquid crystal layer, provided between a pair of electrodes and containing at least one low molecular weight gelling agent, at least one dichroic dye having a substituent represented by formula (1) and at least one host liquid crystal; the light-modulating material transmitting an incident light and changing a transmittance thereof.

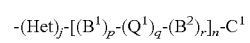

Formula (1)

In formula (1), Het represents an oxygen atom or a sulfur atom; $B^1$ and $B^2$ each independently represent a divalent arylene group, a heteroarylene group or a divalent alicyclic hydrocarbon group; $Q^1$ represents a divalent linking group; $C^1$ represents an alkyl group, a cycloalkyl group, an alkoxy group, an alkoxycarbonyl group, an acyl group or an acyloxy group; j represents 0 or 1; p, q and r each independently represent an integer of 0 to 5; n represents an integer of 1 to 3; (p+r)×n is an integer of 3 to 10; when p is 2 or larger, two or more groups represented by $B^1$ may be the same or different; when q is 2 or larger, two or more groups represented by $Q^1$ may be the same or different; when r is 2 or larger, two or more groups represented by $B^2$ may be the same or different; and when n is 2 or larger, two or more groups represented by $[(B^1)_p\text{-}(Q^1)_q\text{-}(B^2)_r]$ may be the same or different.

DETAILED DESCRIPTION OF THE INVENTION

The invention will be described in detail hereinafter. The phrase " . . . to . . . " involving numerical values represents a range that includes the values before and after "to" as the maximum and the minimum.

The liquid crystal display element and light-modulating material of the invention includes at least one low molecular weight gelling agent, at least one dichroic dye having a substituent represented by the following formula (1), and at least one host liquid crystal.

$\text{-(Het)}_j\text{-}[(B^1)_p\text{-}(Q^1)_q\text{-}(B^2)_r]_n\text{-}C^1$      Formula (1)

In formula, Het represents an oxygen atom or a sulfur atom; $B^1$ and $B^2$ each independently represent a divalent arylene group, a heteroarylene group or a divalent alicyclic hydrocarbon group; $Q^1$ represent a divalent linking group; $C^1$ represents an alkyl group, a cycloalkyl group, an alkoxy group, an alkoxycarbonyl group, an acyl group or an acyloxy group; j represents 0 or 1; p, q and r each independently represent an integer of 0 to 5; n represents an integer of 1 to 3; (p+r)×n is an integer of 3 to 10; when p is 2 or larger, two or more groups represented by $B^1$ may be the same or different; when q is 2 or larger, two or more groups represented by $Q^1$ may be the same or different; when r is 2 or larger, two or more groups represented by $B^2$ may be the same or different; and when n is 2 or larger, two or more groups represented by $[(B^1)_p\text{-}(Q^1)_q\text{-}(B^2)_r]$ may be the same or different.

The liquid crystal display element as used herein refers to a display element having a liquid crystal layer between electrodes, wherein orientation of a host liquid crystal is changed by applying a voltage to the electrodes in order to observe a light obtained by reflecting an external incident light with a reflective layer. The light-modulating material refers to a material having a liquid crystal layer between the electrodes, wherein an observer at one side is able to observe an incident light from another side by applying a voltage to the electrodes in order to change the intensity of a transmission light by changing the orientation of the host liquid crystal. While the light passes through the liquid crystal layer twice in the liquid crystal display element, the light passes through the liquid crystal layer only once in the light-modulating material. A pair of electrodes may be provided in the light-modulating material to form a light-modulating element in order to electrically control the light-modulating state. The term "light-modulating material" includes the "light-modulating element" hereinafter.

Both the liquid display element and light-modulating material include at least one liquid crystal layer containing the low molecular weight gelling agent, dichroic dye and host liquid crystal. The "liquid crystal composition" as used in the specification refers to a composition for the liquid crystal layer, and comprises at least the low molecular weight gelling agent, dichroic dye and host liquid crystal with optionally other additives.

<Liquid Crystal Layer>
(Dichroic Dye)

The dichroic dye used in the invention has at least one substituent represented by the following formula (1):

$\text{-(Het)}_j\text{-}[(B^1)_p\text{-}(Q^1)_q\text{-}(B^2)_r]_n\text{-}C^1$      Formula (1)

In the formula, Het represents an oxygen atom or a sulfur atom; $B^1$ and $B^2$ each independently represent a divalent arylene group, a heteroarylene group or a divalent alicyclic hydrocarbon group; $Q^1$ represent a divalent linking group; $C^1$ represents an alkyl group, a cycloalkyl group, an alkoxy group, an alkoxycarbonyl group, an acyl group or an acyloxy group; j represents 0 or 1; p, q and r each independently represent an integer of 0 to 5; n represents an integer of 1 to 3; (p+r)×n is an integer of 3 to 10; when p is 2 or larger, two or more groups represented by $B^1$ may be the same or different; when q is 2 or larger, two or more groups represented by $Q^1$ may be the same or different; when r is 2 or larger, two or more groups represented by $B^2$ may be the same or different; and when n is 2 or larger, two or more groups represented by $[(B^1)_p\text{-}(Q^1)_q\text{-}(B^2)_r]$ may be the same or different.

In the present invention, the dichroic dye is defined as a compound which is dissolved in a host liquid crystal to exhibit a function of absorbing light. The maximum light-absorbing wavelength and light-absorbing band of the dichroic dye of the present invention is not specifically limited, but it is preferred to have an absorption maximum in the yellow region (Y), magenta region (M), or cyan region (C). The dichroic dye used in the liquid crystal element of the present invention may be used either alone or in combination of two or more. A method of displaying a full color by mixing a yellow dye, a magenta dye and a cyan dye is specifically described in "Color Chemistry" (by Sumio Tokita, Maruzen Co., Ltd., 1982). The yellow region is the range of 430 to 490 nm, the magenta region is the range of 500 to 580 nm, and the cyan region is the range of 600 to 700 nm.

Next, a chromophore used for the dichroic dye of the present invention will be described.

The chromophore used in the dichroic dye is not particularly limited, and examples thereof include azo dyes, anthraquinone dyes, perylene dyes, merocyanine dyes, azomethine dyes, phthaloperylene dyes, indigo dyes, azulene dyes, dioxazine dyes, polythiophene dyes, and phenoxazine dyes. Preferable examples include azo dyes, anthraquinone dyes, phenoxazine dyes, and more preferable examples include anthraquinone dyes and phenoxazone dyes (e.g. phenoxazin-3-one)

The azo dye may be any azo dye such as a monoazo dye, a bisazo dyes, a trisazo dye, a tetrakisazo dye or a pentakisazo dye, and is preferably a monoazo dye, a bisazo dye, or a trisazo dye.

Examples of cyclic structures contained in the azo dye include aromatic groups (e.g. a benzene ring and a naphthalene ring); heterorings (e.g. a quinoline ring, a pyridine ring, a thiazole ring, a benzothiazole ring, an oxazole ring, a benzoxazole ring, an imidazole ring, a benzoimidazole ring, and a pyrimidine ring.

A substituent of the anthraquinone dye is preferably those containing an oxygen atom, a sulfur atom or a nitrogen atom, and examples thereof include an alkoxy group, an aryloxy group, an alkyltio group, an arylthio group, an alkylamino group, and an arylamino group. The number of the substituents for substitution may be any number and the anthraquinone dye preferably has a di-substituted, tri-substituted, or tetrakis-substituted structure, and more preferably di-substituted or tri-substituted structure. The substituting position of the substituent may be any position, and the anthraquinone dye preferably has a 1,4-di-substituted, 1,5-di-substituted, 1,4,5-tri-substituted, 1,2,4-tri-substituted, 1,2,5-tri-substituted, 1,2,4,5,-tetra-substituted, or 1,2,5,6-tetra-substituted structure.

A substituent of the phenoxazone (phenoxazin-3-one) dyes is preferably those containing an oxygen atom, a sulfur atom or a nitrogen atom, and examples thereof include an alkoxy group, an aryloxy group, an alkyltio group, an arylthio group, an alkylamino group, and an arylamino group.

The dichroic dye of the present invention includes a substituent represented by the following formula (1).

Formula (1):

In the formula, Het represents an oxygen atom or a sulfur atom; $B^1$ and $B^2$ each independently represent an arylene group, a heteroarylene group or a divalent alicyclic hydrocarbon group; $Q^1$ represents a divalent linking group; and $C^1$ represents an alkyl group, a cycloalkyl group, an alkoxy group, an alkoxycarbonyl group, an acyl group or an acyloxy group; j represents an integer of 0 or 1; p, q and r each independently represent an integer of 0 to 5; n represents an integer of 1 to 3; and $(p+r)\times n$ is an integer of 3 to 10; when p is 2 or larger, two or more groups represented by $B^1$ may be the same or different; when q is 2 or larger, two or more groups represented by $Q^1$ may be the same or different; when r is 2 or larger, two or more groups represented by $B^2$ may be the same or different; and when n is 2 or larger, two or more groups represented by $[(B^1)_p\text{-}(Q^1)_q\text{-}(B^2)_r]$ may be the same or different Het represents an oxygen atom or a sulfur atom, and is preferably a sulfur atom.

$B^1$ and $B^2$ each independently represent an arylene group, a heteroarylene group or a divalent alicyclic hydrocarbon group, and may have a substituent.

The arylene groups represented by $B^1$ and $B^2$ are each preferably an arylene group having 6 to 20 carbon atoms, more preferably an arylene group having 6 to 10 carbon atoms. Specific examples of the preferable arylene group include benzene, naphthalene and anthracene ring groups. Benzene and substituted benzene ring groups are particularly preferable, and 1,4-phenylene group is further preferable.

The heteroarylene groups represented by $B^1$ and $B^2$ are each preferably a heteroarylene group having 1 to 20 carbon atoms, more preferably a heteroarylene group having 2 to 9 carbon atoms. Specific examples of the preferable heteroarylene group include pyridine, quinoline, isoquinoline, pyrimidine, pyrazine, thiophene, furan, oxazole, thiazole, imidazole, pyrazole, oxadiazole, thiadiazole and triazole rings, and condensed ring heteroarylene groups formed by condensation of these rings.

The divalent alicyclic hydrocarbon groups represented by $B^1$ and $B^2$ are each preferably an alicyclic hydrocarbon group having 3 to 20 carbon atoms, more preferably an acyclic hydrocarbon group having 4 to 10 carbon atoms. Examples of the preferable alicyclic hydrocarbon group include cyclohexanediyl and cyclopentanediyl groups. Cyclohexane-1,2-diyl, cyclohexane-1,3-diyl, cyclopentane-1,4-diyl groups and cyclopentane-1,3-diyl groups are more preferable, and (E)-cyclohexane-1,4-diyl group is particularly preferable.

The divalent arylene group and heteroarylene group, and divalent alicyclic hydrocarbon group represented by $B^1$ and $B^2$ may further have a substituent, and examples of the substituent include the substituents described in the following substituent group V:

[Substituent Group V]

halogen atom (for example chlorine, bromine, iodine or fluorine atom); mercapto group; cyano group; carboxyl group; phosphoric acid group; sulfo group; hydroxyl group; carbamoyl group having 1 to 10, preferably 2 to 8 and more preferably 2 to 5 carbon atoms (for example, methyl carbamoyl, ethyl carbamoyl or morpholino carbamoyl group); sulfamoyl group having 0 to 10, preferably 2 to 8 and more preferably 2 to 5 carbon atoms (for example, methyl sulfamoyl, ethyl sulfamoyl or piperidino sulfamoyl group); nitro group; alkoxy group having 1 to 20, preferably 1 to 10 and more preferably 1 to 8 carbon atoms (for example methoxy, ethoxy, 2-methoxyethoxy or 2-phenyethoxy group); aryloxy group having 6 to 20, preferably 6 to 12 and more preferably 6 to 10 carbon atoms (for example phenoxy, p-methylphenoxy, p-chlorophenoxy or naphthoxy group); acyl group having 1 to 20, preferably 2 to 12 and more preferably 2 to 8 carbon atoms (for example acetyl, benzoyl or trichloroacetyl group); acyloxy group having 1 to 20, preferably 2 to 12 and more preferably 2 to 8 carbon atoms (for example acetyloxy or benzoyloxy group); acylamino group having 1 to 20, preferably 2 to 12 and more preferably 2 to 8 carbon atoms (for example acetylamino group); sulfonyl group having 1 to 20, preferably 1 to 10 and more preferably 1 to 8 carbon atoms (for example methanesulfonyl, ethanesulfonyl or benzenesulfonyl group); sulfonyl group having 1 to 20, preferably 1 to 10 and more preferably 1 to 8 carbon atoms (for example methanesulfinyl, ethanesulfinyl or benzenesulfinyl group); substituted or non-substituted amino group having 1 to 20, preferably 1 to 12 and more preferably 1 to 8 carbon atoms (for example amino, methylamino, dimethylamino, benzylamino, anilino, diphenylamino, 4-methylphenylamino, 4-ethylphenylamino, 3-n-propylphenylamino, 4-n-propylphenylamino, 3-n-butylphenylamino, 4-n-butylphenylamino, 3-n-pentylphenylamino, 4-n-pentylphenylamino, 3-trifluoromethylphenylamino, 4-trifluoromethylphenylamino, 2-pyridylamino, 3-pyridylamino, 2-tiazolylamino, 2-oxazolylamino, N,N-methylphenylamino or N,N-ethylphenylamino group); ammonium group having 0 to 15, preferably 3 to 10 and more preferably 3 to 6 carbon atoms (for example trimethylammonium or triethylammonium group); hydrazino group having 0 to 15, preferably 1 to 10 and more preferably 1 to 6 carbon atoms (for example trimethylhydrazino group); ureido group having 1 to 15, preferably 1 to 10 and more preferably 1 to 6 carbon atoms (for example ureido or N,N-dimethylureido group); imide group having 1 to 15, preferably 1 to 10 and more preferably 1 to 6 carbon atoms (for example succinimide group); alkylthio group having 1 to 20, preferably 1 to 12 and more preferably 1 to 8 carbon atoms (for example methylthio, ethylthio or propylthio group); arylthio group having 6 to 80, preferably 6 to 40 and more preferably 6 to 30 carbon atoms (for example phenylthio, p-methylphenylthio, p-chlorophenylthio, 2-pyridylthio, 1-naphthylthio, 2-naphthylthio, 4-propylcyclohexyl-4'-biphenylthio, 4-butylcyclohexyl-4'-biphenylthio, 4-pentylcyclohexyl-4'-biphenylthio or 4-propylphenyl-2-ethynyl-4'-biphenylthio group); heteroarylthio group having 1 to 80, preferably 1 to 40 and more preferably 1 to 30 carbon atoms (for example 2-pyridylthio, 3-pyridylthio, 4-pyridylthio, 2-quinolylthio, 2-furylthio or 2-pyrolylthio group); alkoxycarbonyl group having 2 to 20, preferably 2 to 12 and more preferably 2 to 8 carbon atoms (for example methoxycarbonyl, ethoxycarbonyl or 2-benzyloxycarbonyl group); aryloxy carbonyl group having 6 to 20, preferably 6 to 12 and more preferably 6 to 10 carbon atoms (for example phenoxycarbonyl group); non-substituted alkyl group having 1 to 18, preferably 1 to 10 and more preferably 1 to 5 carbon atoms (for example methyl, ethyl, propyl or butyl group), a substituted alkyl group having 1 to 18, preferably 1 to 10 and more preferably 1 to 5 carbon atoms [for example hydroxymethyl, trifluoromethyl, benzyl, carboxyethyl, ethoxycarbonylmethyl or acetylaminomethyl group, wherein unsaturated hydrocarbon group having 2 to 18, preferably 3 to 10 and more preferably 3 to 5 carbon atoms (for example, vinyl, ethynyl, 1-cyclohexenyl, benzylidyne or benzylidene group) is also included in the substituted alkyl groups], substituted or non-substituted aryl group having 6 to 20, preferably 6 to 15 and more preferably 6 to 10 carbon atoms (for example phenyl, naphthyl, p-carboxyphenyl, p-nitrophenyl, 3,5-dichlorophenyl, p-cyanophenyl, m-fluorophenyl, p-tolyl, 4-propylcyclohexyl-4'-biphenyl, 4-butylcyclohexyl-4'-biphenyl, 4-pentylcyclohexyl-4'-biphenyl or 4-propylphenyl-2-ethynyl-4'-biphenyl); and substituted or non-substituted heteroaryl group having 1 to 20, preferably 2 to 10 and more preferably 4 to 6 carbon atoms (for example pyridyl, 5-methylpyridyl, thienyl, furyl, morpholino or tetrehydrofurfuryl group.

The substituents described in the substituent group V may have a structure in which benzene rings or naphthalene rings are condensed. These substituents may be further substituted with the substituents described in the substituent group V as described above.

Among the substituents described in the substituent group V, alkyl group, aryl group, alkoxy group, aryloxy group, halogen atom, amino group, substituted amino group, hydroxyl group, alkylthio group and arylthio group are preferable, and alkyl group, aryl group and halogen atom are more preferable.

$Q^1$ represents a divalent linking group. The linking group preferably includes an atomic group containing at least one atom selected from carbon, nitrogen, sulfur and oxygen atoms. Examples of the divalent linking group represented by $Q^1$ include a divalent linking group having 0 to 60 carbon atoms constituted by containing one or more of an alkylene group having preferably 1 to 20, more preferably 1 to 10 carbon atoms (for example methylene, ethylene, propylene, butylene, pentylene or cyclohexyl-1,4-diyl group); an alkenylene group having preferably 2 to 20, more preferably 2 to 10 carbon atoms (for example ethenylene group); an alkynylene group having preferably 2 to 20, more preferably 2 to 10 carbon atoms (for example ethynylene group); an amide group; ether group; an ester group; a sulfonamide group; a sulfonic acid ester group; an ureido group; a sulfonyl group; a sulfinyl group; a thioether group; a carbonyl group; a —NR— group (R represents a hydrogen atom, an alkyl group or an aryl group, wherein the alkyl group represented by R is an alkyl group having preferably 1 to 20, more preferably 1 to 10 carbon atoms, and the aryl group represented by R is an aryl group having preferably 6 to 14, more preferably 6 to 10 carbon atoms); an azo group; an azoxy group; and a divalent heterocyclic group having preferably 2 to 20, more preferably 4 to 10 carbon atoms (for example piperadine-1,4-diyl group).

The divalent linking group represented by $Q^1$ is preferably an alkylene group, an alkenylene group, an alkynilene group, an ether group, a thioether group, an amide group, an ester group or a carbonyl group, or a group as a combination of these groups.

$Q^1$ may further have a substituent, and examples of the substituent include those described in the substituent group V.

$C^1$ represents an alkyl group, a cycloalkyl group, an alkoxy group, an alkoxycarbonyl group, an acyl group or an acyloxy group. The alkyl group, cycloalkyl group, alkoxy group, alkoxycarbonyl group, acyl group or acyloxy group represented by $C^1$ include respective groups having substituents.

$C^1$ preferably represents an alkyl or cycloalkyl group having 1 to 30, more preferably 1 to 12, and further preferably 1 to 8 carbon atoms (for example methyl, ethyl, propyl, butyl, t-butyl, i-butyl, s-butyl, pentyl, t-pentyl, hexyl, heptyl, octyl, cyclohexyl, 4-methylcyclohexyl, 4-ethylcyclohexyl, 4-propylcyclohexyl, 4-butylcyclohexyl, 4-pentylcyclohexyl; hydroxymethyl, trifluoromethyl or benzyl group); an alkoxy group having 1 to 20, more preferably 1 to 10, and further preferably 1 to 8 carbon atoms (for example methoxy, ethoxy, 2-methoxyethoxy or 2-phenylethoxy group); an acyloxy group having 1 to 20, more preferably 2 to 12, and further preferably 2 to 8 carbon atoms (for example acetyloxy or benzoyloxy group), an acyl group having 1 to 30, more preferably 1 to 12, and further preferably 1 to 8 carbon atoms (for example acetyl, formyl, pivaloyl, 2-chloroacetyl, stearoyl, benzoyl or p-n-octyloxyphenylcarbonyl group); or an alkoxycarbonyl group having 2 to 20, more preferably 2 to 12, and further preferably 2 to 8 carbon atoms (for example methoxycarbonyl, ethoxycarbonyl or 2-benzyloxycarbonyl group).

$C^1$ is preferably an alkyl group or an alkoxy group, more preferably an ethyl group, a propyl group, a butyl group, a pentyl group, a hexyl group or a trifluoromethoxy group.

$C^1$ may be further substituted, and examples of the substituent include those in the substituent group V.

The substituent for the alkyl group represented by $C^1$ is preferably a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, or an aryloxycarbonyl group among the substituents described in the substituent group V.

The substituent for the cycloalkyl group represented by $C^1$ is preferably a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, an aryloxycarbonyl group, or an alkyl group among the substituents described in the substituent group V.

The substituent for the alkoxy group represented by $C^1$ is preferably a halogen atom (especially a fluorine atom), a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, or an aryloxycarbonyl group among the substituents described in the substituent group V.

The substituent for the alkoxycarbonyl group represented by $C^1$ is preferably a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, or an aryloxycarbonyl group among the substituents described in the substituent group V.

The substituent for the acyl group represented by $C^1$ is preferably a halogen atom, a cyano group, a hydroxy group, a carbamoyl group, an alkoxy group, an aryloxy group, an acyl group, an acyloxy group, an acylamino group, an alkylthio group, an arylthio group, a heteroarylthio group, an alkoxycarbonyl group, or an aryloxycarbonyl group among the substituents described in the substituent group V.

The substituent for the acyloxyl group represented by $C^1$ is preferably a halogen atom, a cyano group, a hydroxy group, a carbamoyl, an alkoxy group, an aryloxy group, an acyl group, an acylamino group, an amino group, an alkylthio group, an arylthio group, a heteroarylthio group, an alkoxycarbonyl group, or an aryloxycarbonyl group among the substituents described in the substituent group V.

"j" represents 0 or 1, and preferably 0.

"p", "q", and "r" each independently represent an integer of 0 to 5, and "n" represents an integer of 1 to 3. The total number of the groups represented by $B^1$ and $B^2$, that is, (p+r)×n, is an integer of 3 to 10, and more preferably an integer of 3 to 5. When p is 2 or larger, two or more groups represented by $B^1$ may be the same or different; when q is 2 or larger, two or more groups represented by $Q^1$ may be the same or different; when r is 2 or larger, two or more groups represented by $B^2$ may be the same or different; when n is 2 or larger, two or more groups represented by $[(B^1)_p\text{-}(Q^1)_q\text{-}(B^2)_r]$ may be the same or different.

The preferable combinations of p, q, r, and n are as follows:
(i) p=3, q=0, r=0, n=1;
(ii) p=4, q=0, r=0, n=1;
(iii) p=5, q=0, r=0, n=1;
(iv) p=2, q=0, r=1, n=1;
(v) p=2, q=1, r=1, n=1;
(vi) p=1, q=1, r=2, n=1;
(vii) p=3, q=1, r=1, n=1;
(viii) p=2, q=0, r=2, n=1;
(ix) p=1, q=1, r=1, n=2;
(x) p=2, q=1, r=1, n=2.

Particularly preferable combinations are (i) p=3, q=0, r=0, n=1; (iv) p=2, q=0, r=1, n=1; and (v) p=2, q=1, r=1, and n=1.

Further, $-[(B^1)_p\text{-}(Q^1)_q\text{-}(B^2)_r]_n\text{-}C^1$ preferably contains a partial structure having a liquid crystallinity. The phase of the liquid crystal is not specifically limited, but a nematic liquid crystal, a smectic liquid crystal, and a discotic liquid crystal are preferable, and the nematic liquid crystal is particularly preferable.

Specific examples of $-[(B^1)_p\text{-}(Q^1)_q\text{-}(B^2)_r]_n\text{-}C^1$ will be described below, but the present invention is not limited to these examples (in the following formulae, the wavy lines indicate the linking positions).

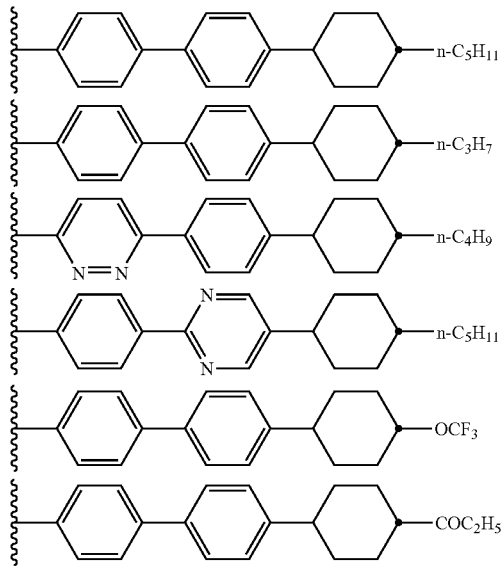

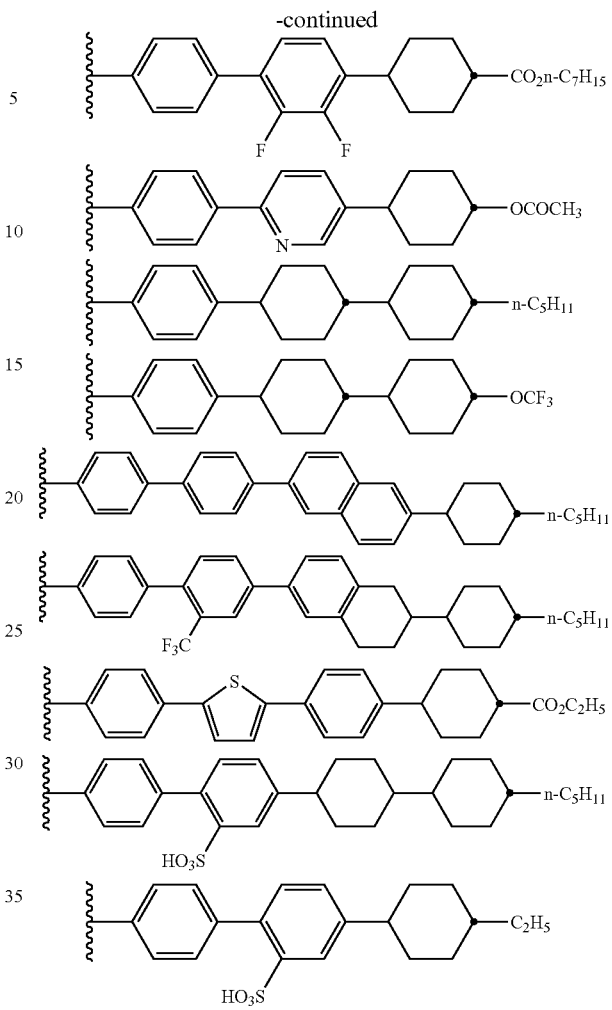

The dichroic dye used in the present invention has preferably one or more substituents represented by the formula $-[(B^1)_p\text{-}(Q^1)_q\text{-}(B^2)_r]_n\text{-}C^1$, and more preferably 1 to 8 groups, furthermore preferably 1 to 4 groups and even more preferably 1 to 2 groups.

A preferred structure of substituents represented by formula (1) is the following combination.

[1] A structure in which Het is a sulfur atom, $B^1$ represents an aryl group or a heteroaryl group, $B^2$ represents a cyclohexane-1,4-diyl group, $C^1$ represents an alkyl group, and j=1, p=2, q=0, r=1, and n=1.

[2] A structure in which Het is a sulfur atom, $B^1$ represents an aryl group or a heteroaryl group, $B^2$ represents a cyclohexane-1,4-diyl group, $C^1$ represents an alkyl group, and j=1, p=1, q=0, r=2, and n=1.

Particularly preferred structures are as follows:

[I] A structure in which Het represents a sulfur atom, $B^1$ represents a 1,4-phenylene group, $B^2$ represents a trans-cyclohexyl group, $C^1$ represents an alkyl group (preferably methyl group, ethyl group, propyl group, butyl group, pentyl group or hexyl group), and j=1, p=2, q=0, r=1, and n=1, as represented by formula (a-1) below.

[II] A structure in which Het represents a sulfur atom, $B^1$ represents a 1,4-phenylene group, $B^2$ represents a trans-cyclohexane-1,4-diyl group, $C^1$ represents an alkyl group (preferably methyl group, ethyl group, propyl group, butyl group, pentyl group or hexyl group), and j=1, p=1, q=0, r=2, and n=1, as represented by formula (a-2) below;

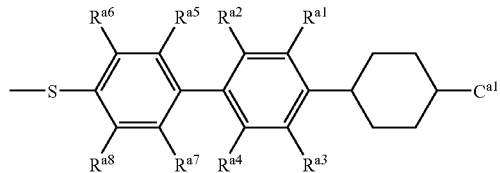

Formula (a-1)

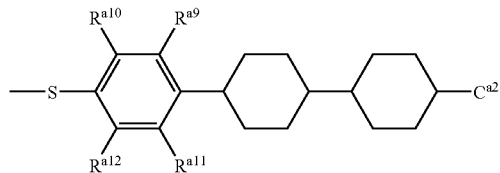

Formula (a-2)

In formulae (a-1) and (a-2), $R^{a1}$ to $R^{a12}$ each independently represent a hydrogen atom or a substituent. The substituent may be selected from the substituent group V as described above.

It is preferable that $R^{a1}$ to $R^{a12}$ each independently represent a hydrogen atom, a halogen atom (in particular, fluorine atom), an alkyl group, an aryl group, and an alkoxy group. Of the alkyl group, aryl group, and alkoxy group represented by $R^{a1}$ to $R^{a12}$, preferred alkyl group, aryl group, and alkoxy group are the same described in the substituent group V in the above.

In formulae (a-1) and (a-2), $C^{a1}$ and $C^{a2}$ each independently represent an alkyl group, preferably an alkyl group having 1 to 20 carbon atoms, more preferably 1 to 10 carbon atoms. Particularly preferred examples are a methyl group, ethyl group, propyl group, butyl group, pentyl group, and hexyl group.

Among the substituents represented by formula (a-1) and the substituents represented by formula (a-2), as the substituent represented by formula (1), the substituents represented by formula (a-1) in which $C^{a1}$ is a long chain alkyl group having 3 to 10 carbon atoms and the substituents represented by formula (a-2) in which $C^{a2}$ is a long chain alkyl group having 3 to 10 carbon atoms are particularly suitable for the liquid crystal display element since a reflectance on a white background is enhanced by combining with a low molecular weight gelling agent. While the reason is not clear yet, it is speculated that the interaction between the dye and gelling agent is reduced.

Among the substituents represented by formula (a-1) and the substituents represented by formula (a-2), as the substituent represented by formula (1), the substituents represented by formula (a-1) in which $C^{a1}$ is a long chain alkyl group having 3 to 10 carbon atoms and the substituents represented by formula (a-2) in which $C^{a2}$ is a long chain alkyl group having 3 to 10 carbon atoms are particularly suitable for the light-modulating material since a transmittance at a transparent state is enhanced by combining with a low molecular weight gelling agent. While the reason is not clear yet, it is speculated that the interaction between the dye and gelling agent is reduced.

The azo dye may be any azo dye such as a monoazo dye, a bisazo dye, a trisazo dye, a tetrakisazo dye or a pentakisazo dye, and is preferably a monoazo dye, a bisazo dyes or a trisazo dye.

Examples of cyclic structures contained in the azo dye include aromatic groups (e.g. a benzene ring and a naphthalene ring); heterorings (e.g. a quinoline ring, a pyridine ring, a thiazole ring, a benzothiazole ring, an oxazole ring, a benzoxazole ring, an imidazole ring, a benzoimidazole ring, and a pyrimidine ring.

A substituent of the anthraquinone dye is preferably those containing an oxygen atom, a sulfur atom or a nitrogen atom, and examples thereof include an alkoxy group, an aryloxy group, an alkyltio group, an arylthio group, an alkylamino group, and an arylamino group.

The number of the substituents for substitution may be any number and the anthraquinone dye has preferably a di-substituted, tri-substituted, or tetrakis-substituted structure, and more preferably a di-substituted or tri-substituted structure. The substituting position of the substituent may be any position, and the anthraquinone dye preferably has a 1,4-di-substituted, 1,5-di-substituted, 1,4,5-tri-substituted, 1,2,4-trisubstituted, 1,2,5-trisubstituted, 1,2,4,5,-tetra-substituted, or 1,2,5,6-tetrasubstituted structure.

The anthraquinone dye is preferably a compound represented by the following formula (2), and the phenoxazone dye is preferably a compound represented by the following formula (3).

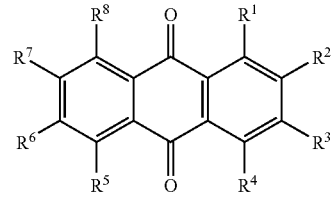

Formula (2)

In formula (2), at least one of $R^1$, $R^2$, $R^3$, $R^4$, $R^5$, $R^6$, $R^7$, and $R^8$ is $-(Het)_j-[(B^1)_p-(Q^1)_q-(B^2)_r]_n-C^1$ and the remaining groups each independently represent a hydrogen atom or a substituent.

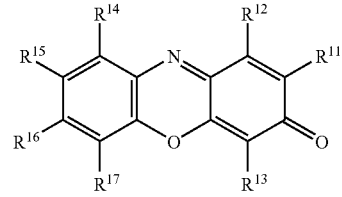

Formula (3)

In formula (3) at least one of $R^{11}$, $R^{12}$, $R^{13}$, $R^{14}$, $R^{15}$, $R^{16}$ and $R^{17}$ is $-(Het)_j-[(B^1)_p-(Q^1)_q-(B^2)_r]_n-C^1$, and the remaining groups each independently represent a hydrogen atom or a substituent.

Het, $B^1$, $B^2$, $Q^1$, p, q, r, n and $C^1$ in formulae (2) and (3) are synonymous with Het, $B^1$, $B^2$, $Q^1$, p, q, r, n and $C^1$ in formula (1).

While examples of the substituents represented by $R^1$, $R^2$, $R^3$, $R^4$, $R^5$, $R^6$, $R^7$ and $R^8$ include those in substituent group V, preferable examples thereof include arylthio groups having 6 to 80, more preferably 6 to 40 and further preferably 6 to 30 carbon atoms (for example phenylthio, p-methylphenylthio, p-chlorophenylthio, 4-methylphenylthio, 4-ethylphenylthio, 4-n-propylphenylthio, 2-n-butylphenylthio, 3-n-butylphenylthio, 4-n-butylphenylthio, 2-t-butylphenylthio, 3-t-butylphenylthio, 4-t-butylphenylthio, 3-n-pentylphenylthio, 4-n-pentylphenylthio, 4-amylpentylphenylthio, 4-hexylphenylthio, 4-heptylphenylthio, 4-octylphenylthio, 4-trilfluorophenylthio, 3-trilfluorophenylthio, 2-pyridyllthio, 1-naphthylthio, 2-naphthylthio, 4-propylcyclohexyl-4'-biphenylthio, 4-butylcyclohexyl-4'-biphenylthio, 4-pentylcyclohexyl-4'-biphenylthio and 4-propylphenyl-2-ethyl-4'-biphenylthio groups); heteroarylthio groups having 1 to 80, preferably 1 to 40 and more preferably 1 to 30 carbon atoms (for example 2-pyridylthio, 3-pyridylthio, 4-pyridylthio, 2-quinolylthio, 2-furylthio and 2-pyrrolylthio groups); substituted or non-substituted alkylthio groups (for example methylthio, ethylthio, butylthio and phenethylthio groups); substituted or non-substituted amino groups (for example amino, methylamino, dimethylamino, benzylamino, anilino, diphenylamino, 4-methylphenylamino, 4-ethylphenylamino, 3-n-propylphenylamino, 4-n-propylphenylamino, 3-n-butylphenylamino, 4-n-butylphenylamino, 3-n-pentylphenylamino, 4-n-pentylphenylamino, 3-trifluoromethylphenylamino, 4-trifluoromethylphenylamino, 2-pyridylamino, 3-pyridylamino, 2-thiazolylamino, 2-oxazolylamino and N,N-methylphenylamine, N,N-ethylphenylamine groups), halogen atoms (for example fluorine and chlorine atoms), substituted or non-substituted alkyl groups (for example methyl and trifluoromethyl groups), substituted or non-substituted alkoxy groups (for example methoxy and trifluoromethoxy groups), substituted or non-substituted aryl groups (for example phenyl group), substituted or non-substituted heteroaryl groups (for example 2-pyridyl group), substituted or non-substituted aryloxy groups (for example phenoxy group); and substituted or non-substituted heteroaryloxy groups (for example 3-thienyloxy group).

$R^1$, $R^2$, $R^3$, $R^4$, $R^5$, $R^6$, $R^7$ and $R^8$ are each independently preferably a hydrogen atom, a fluorine atom, a chlorine atom, a substituted or non-substituted arylthio group, a substituted or non-substituted alkylthio group, a substituted or non-substituted amino group, a substituted or non-substituted alkylamino group, a substituted or non-substitited arylamino group, a substituted or non-substituted alkyl group, a substituted or non-substituted aryl group, a substituted or non-substituted alkoxy group or a substituted or non-substituted aryloxy group; particularly preferably a hydrogen atom, a fluorine atom, a substituted or non-substituted arylthio group, a substituted or non-substituted alkylthio group, a substituted or non-substituted amino group, a substituted or non-substituted alkylamino group or a substituted or non-substituted arylamino groups.

Further preferably, at least one of $R^1$, $R^4$, $R^5$ and $R^8$ in formula (2) is -(Het)$_j$-[(B$^1$)$_p$-(Q$^1$)$_q$-(B$^2$)$_r$]$_n$-C$^1$.

Examples of the substituents represented by $R^{11}$, $R^{12}$, $R^{13}$, $R^{14}$, $R^{15}$, $R^{16}$ and $R^{17}$ include a halogen atom, an alkyl group, an aryl group, an alkilthio group, an arylthio group, a heterocyclic thio group, a hydroxyl group, an alkoxy group, an aryloxy group, a carbamoyl group, an acyl group, an aryloxycarbonyl group, an alkoxycarbonyl group and an amide group. A hydrogen atom, a halogen atom, an alkyl group, an arylthio group and an amide group are particularly preferable.

$R^{16}$ is preferably an amino group (including alkylamino and arylamino groups), a hydroxyl group, a mercapto group, an alkylthio group, an arylthio group, an alkoxy group or an aryloxy group, particularly preferably an amino group.

While specific examples of the dichroic dye available in the invention are shown below, the invention is by no means restricted to the specific examples as set forth below.

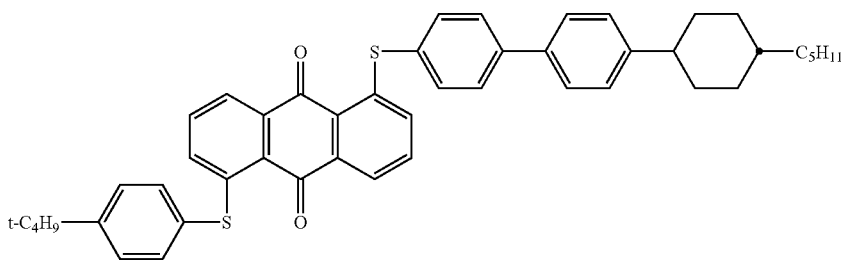

No.1-1

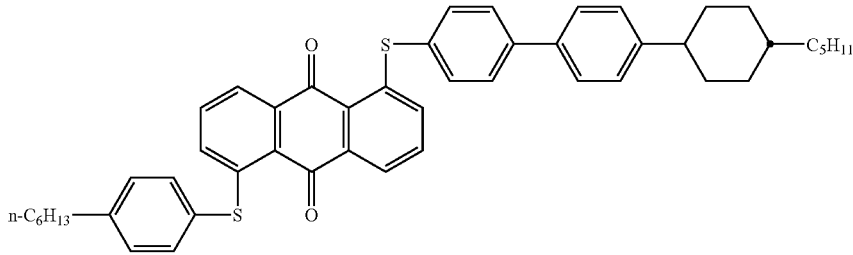

No.1-2

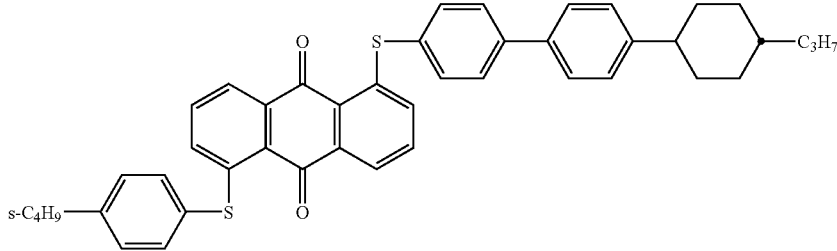

No.1-3

-continued
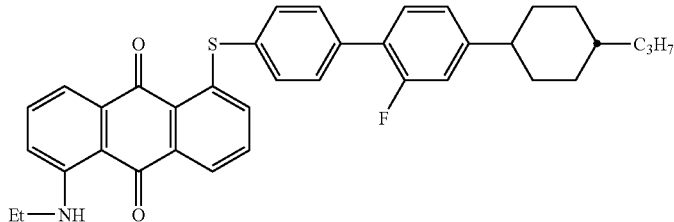
No.1-4
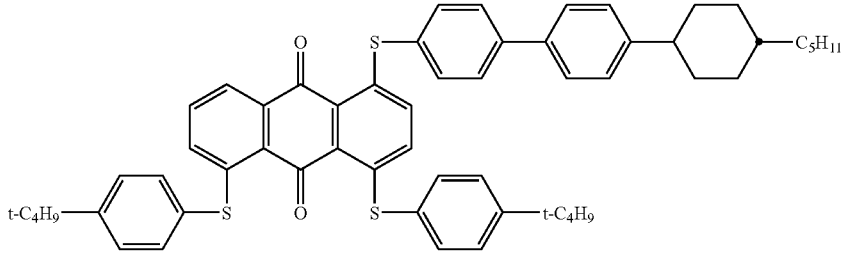
No.1-5
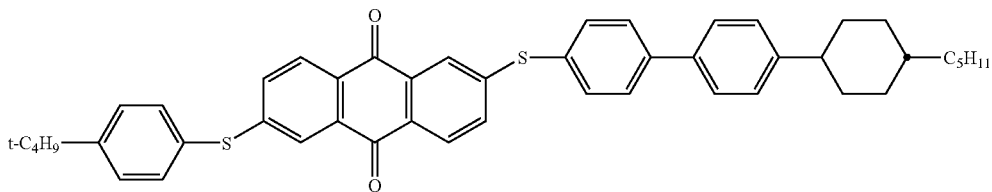
No.1-6
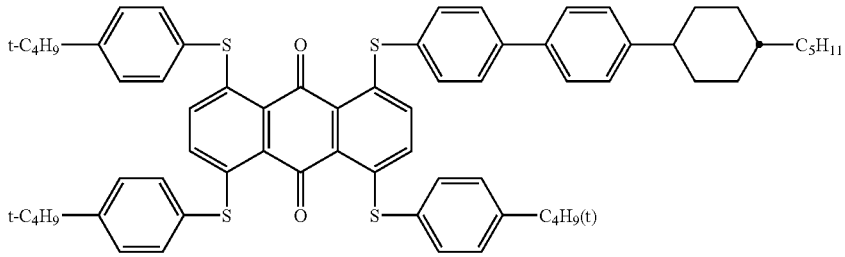
No.1-7
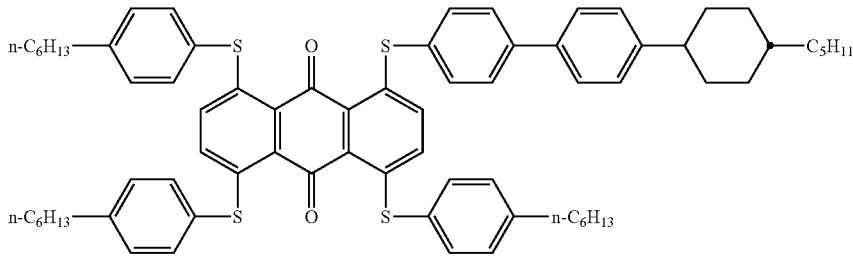
No.1-8
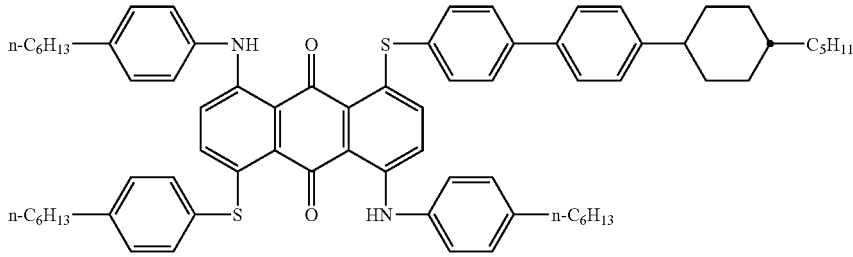
No.1-9

-continued
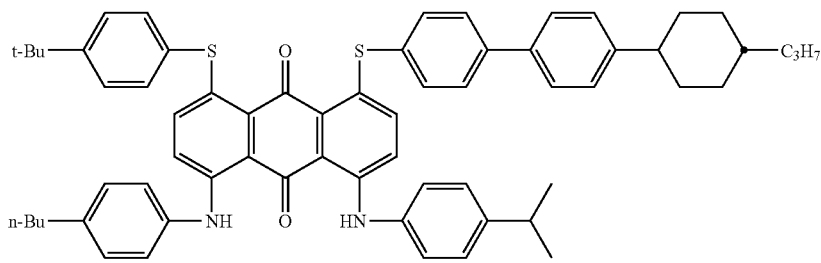
No.1-10
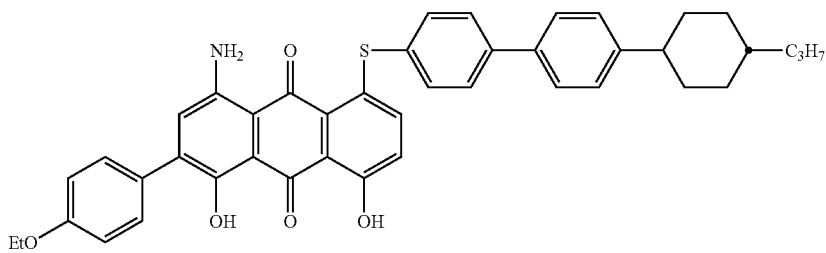
No.1-11
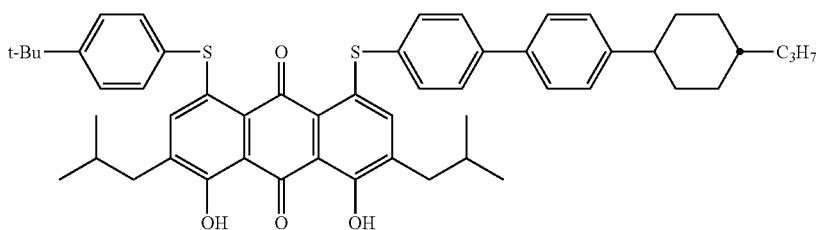
No.1-12
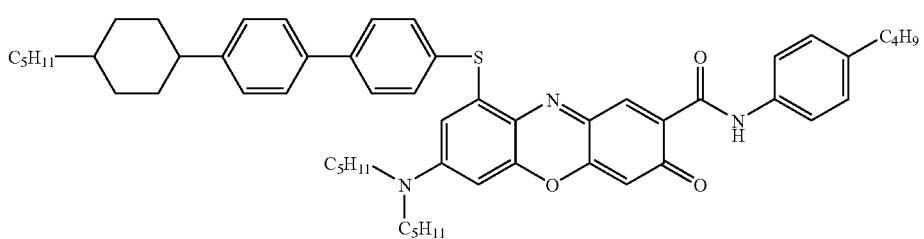
No.1-13
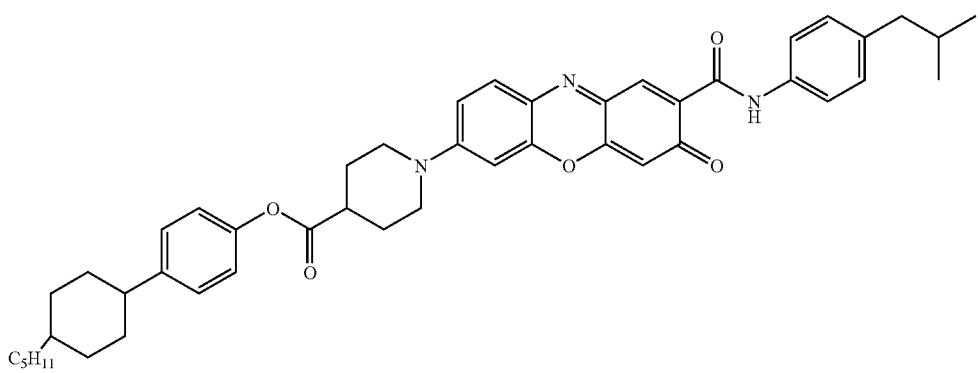
No.1-14

-continued
No.1-15
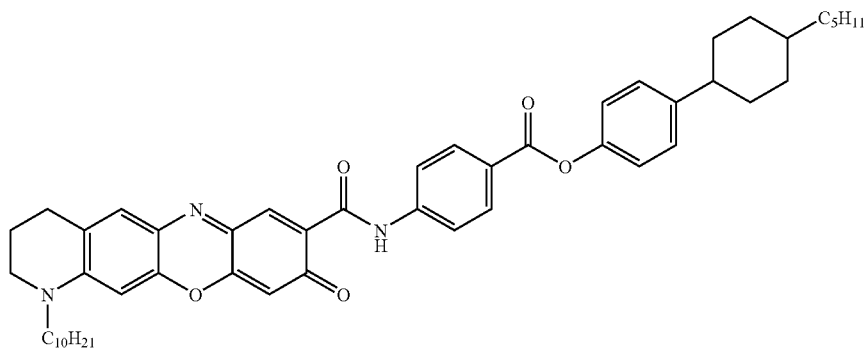
No.1-16
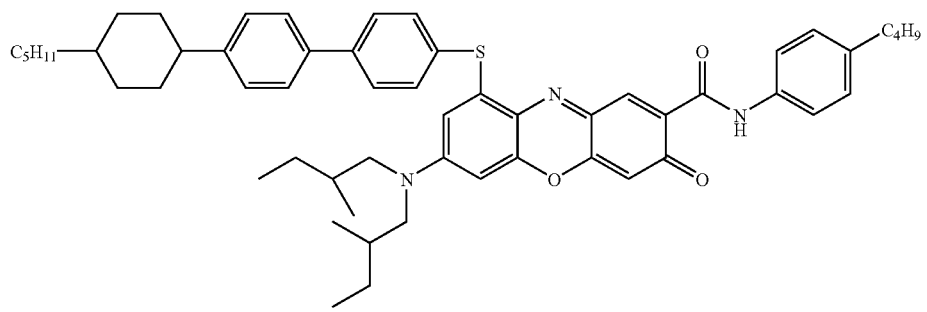
Specific examples of azo type dichroic dyes usable for the present invention are shown below, but the present invention is not limited to these specific examples.
No. 2-1
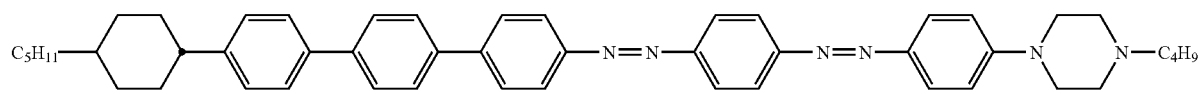
No. 2-2
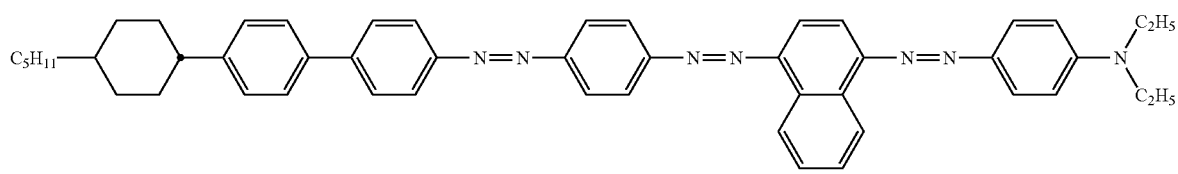
No. 2-3
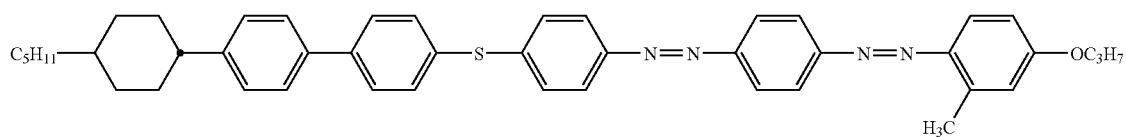

Specific examples of dioxazine type dichroic dyes and merocyanine type dichroic dyes usable for the present invention are shown below, but the present invention is not limited to these specific examples.

molecular weight gelling agent is so readily stained with the dichroic dye that the contrast ratio tends to be decreased.

While any low molecular weight gelling agents may be used, the low molecular weight gelling agent of the invention No.3-1

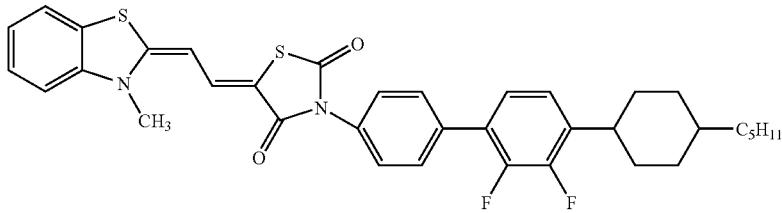

No.3-2

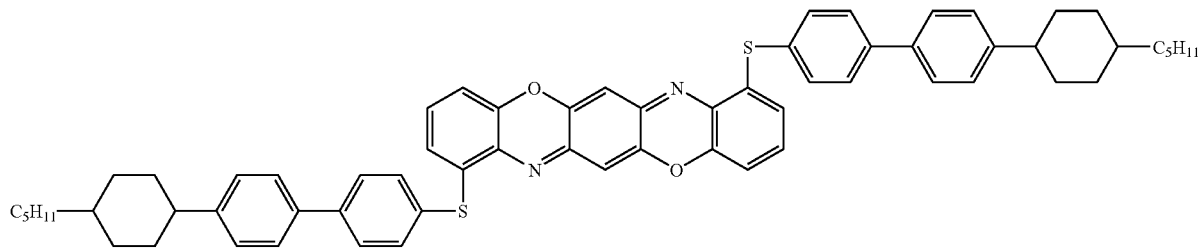

A dichroic dye having a substituent represented by the above-mentioned formula (1) can be synthesized by combining conventionally known methods. For example, it can be synthesized by the method described in JP-A No. 2003-192664.

(Low Molecular Weight Gelling Agent)

At least one low molecular weight gelling agent is used in the liquid crystal display element and light-modulating material of the invention. The low molecular weight gelling agent is defined as a low molecular weight material capable of forming a gelled liquid crystal composition when mixed with a host liquid crystal. A gel network formed with the gelling agent and the host liquid crystal forms a micro-phase separation structure by gelation of the liquid crystal composition to enable the light to be scattered when the refractive index of the network of the gelling agent differs from the refractive index of the randomly distributed host liquid crystal. On the other hand, when the host liquid crystal is aligned in a direction perpendicular to the electrode substrate, a transparent state exhibiting no light scattering may be attained by allowing the refractive index of the major axis of the host liquid crystal molecule to be approximately the same as the refractive index of the gelling agent. Since the network of the gelling agent which is loosely formed with hydrogen bonds does not inhibit the movement of the host liquid crystal too much, switching between the scattering and transparent states may be facilitated.

The "low molecular weight" gelling agent refers to a gelling agent having a molecular weight approximately in the range of 10 to 1000, preferably 50 to 500. The advantage of using the low molecular weight gelling agent in place of a high molecular weight gelling agent is that an driving voltage necessary for changing the orientation of the liquid crystal can be lowered, switching rate between the scattering state and transparent state can be increased, and the low molecular weight gelling agent is less stained with the dichroic dye to enable the contrast ratio to be improved, while the high preferably has at least two hydrogen-bonding groups. While examples of the hydrogen-bonding group include amide, hydroxyl, carboxyl, ester and amino groups, compounds having at least two amide groups are more preferable as the low molecular weight gelling agent. In addition, the gelling agent of the invention preferably has a linear alkyl group having 4 to 20 carbon atoms at the terminal, and the alkyl group may be substituted. Furthermore, the low molecular weight gelling agent of the invention preferably has a linear (per)fluoroalkyl group having 4 to 20 carbon atoms at the terminal, and the (per)fluoroalkyl group may be substituted. Moreover, the gelling agent of the invention preferably has an alicyclic structure.

Examples of preferable combination of structures include a combination of a structure having at least two hydrogen-bonding groups and a structure having, at the terminal, a linear alkyl group having 4 to 20 carbon atoms that may be substituted; a combination of a structure having at least two hydrogen-bonding groups and a structure having, at the terminal, a linear (per)fluoroalkyl group having 4 to 20 carbon atoms that may be substituted; and a combination of a structure having at least two hydrogen-bonding groups and a structure having an alicyclic structure.

Other examples of the preferable combination of the structures include: a combination of a structure having at least two hydrogen-bonding groups, a structure having, at the terminal, a linear alkyl group having 4 to 20 carbon atoms that may be substituted, and a structure having, at the terminal, a linear (per)fluoroalkyl group having 4 to 20 carbon atoms that may be substituted; a combination of a structure having at least two hydrogen-bonding groups, a structure having, at the terminal, a linear alkyl group having 4 to 20 carbon atoms that may be substituted, and a structure having an alicyclic structure; a combination of a structure having at least two hydrogen-bonding groups, a structure having, at the terminal, a linear (per)fluoroalkyl group having 4 to 20 carbon atoms that may be substituted, and a structure having an alicyclic structure; and a combination of a structure having at least two hydrogen-bonding groups, a structure having, at the terminal, a linear alkyl group having 4 to 20 carbon atoms that may be substituted, a structure having, at the terminal, a linear (per) fluoroalkyl group having 4 to 20 carbon atoms that may be substituted and a structure having an alicyclic structure.

A low molecular weight gelling agent having no aromatic group is also preferable since stainability with the dichroic dye is reduced. Specific examples thereof include compounds in which cites having at least two hydrogen-bonding groups are linked with a linking group. The linking group may be, for example, an alkylene group, an alkenylene group or an alkynylene group. The alkylene group preferably has 1 to 12 carbon atoms, more preferably 1 to 10 carbon atoms, and examples of the alkylene group include methylene, ethylene, propylene, butylene, pentylene, cyclohexyl-1,4-diyl and cyclohexyl-1,2-diyl groups. The alkenylene group preferably has 2 to 12 carbon atoms, more preferably 2 to 10 carbon atoms, and examples of the alkenylene group include ethenylene group. The alkynylene group preferably has 2 to 12 carbon atoms, more preferably 2 to 10 carbon atoms, and examples of the alkynylene group include ethynylene group.

Preferable examples of the low molecular weight gelling agent include compounds represented by the following formula (4):

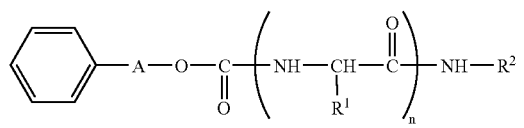

Formula (4)

In formula (4), A represents an alkylene group, an alkenylene group or an alkynylene group. The alkylene group preferably has 1 to 12 carbon atoms, more preferably 1 to 10 carbon atoms, and examples of the alkylene group include methylene, ethylene, propylene, butylene, pentylene or cyclohexyl-1,4-diyl. The alkenylene group preferably has 2 to 12 carbon atoms, more preferably 2 to 10 carbon atoms, and examples thereof include ethenylene group. The alkynylene group preferably has 2 to 12 carbon atoms, more preferably 2 to 10 carbon atoms, and examples thereof include ethynylene group.

In formula (4), $R^1$ represents an alkyl group or an aryl group. $R^1$ is preferably a secondary alkyl group having 3 to 10 carbon atoms, more preferably a secondary alkyl group having 3 to 5 carbon atoms.

In formula (4), $R^2$ represents an alkyl group or an aryl group. $R^2$ is preferably an alkyl group having 1 to 30 carbon atoms, more preferably a secondary alkyl group having 4 to 20 carbon atoms. The alkyl group may further have a substituent, and examples of the substituent include an amide group, a hydroxyl group, a carboxyl group and an amino group.

In formula (4), n represents an integer of 1 to 5, preferably 1 to 3.

Specific examples of the low molecular weight gelling agent include those described in a literature (Advanced Material, Vol. 12, p 1237, 2000; J. Mater. Chem., Vol. 12, p 2197-2201, 2002). While specific examples of the compounds used in the invention as the low molecular weight gelling agent are shown below, the invention is by no means restricted to the following specific examples.

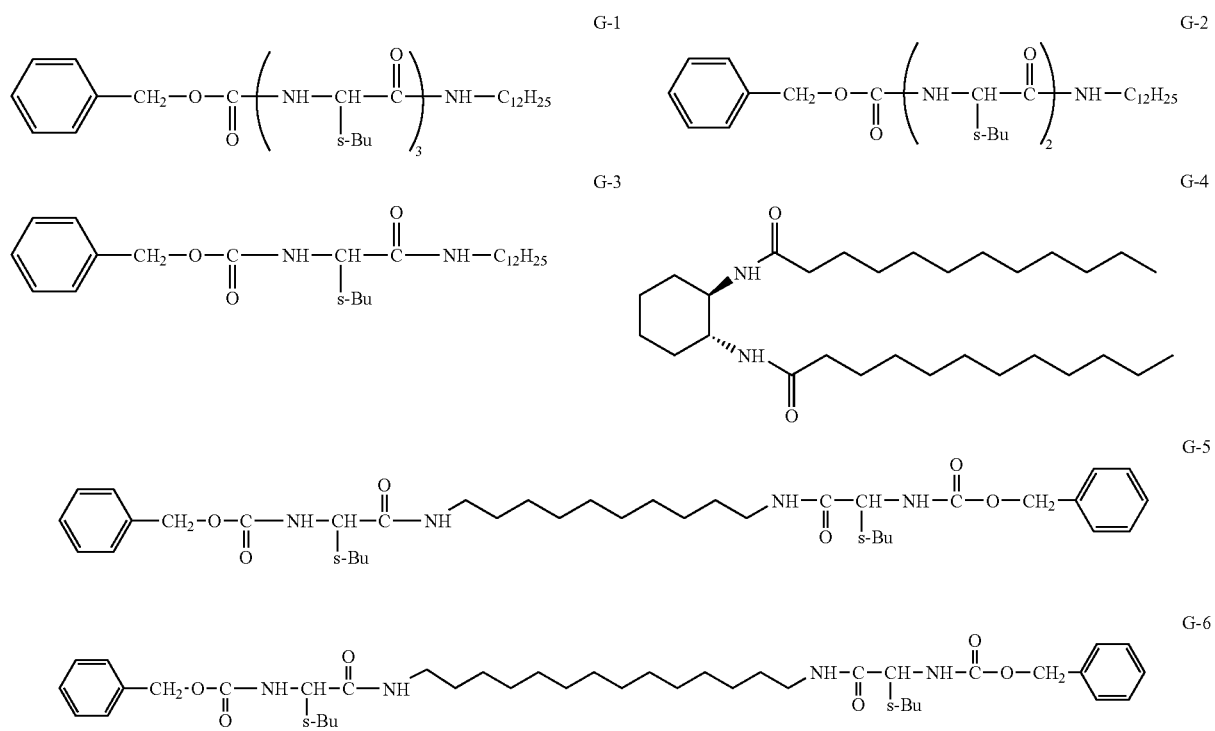

-continued

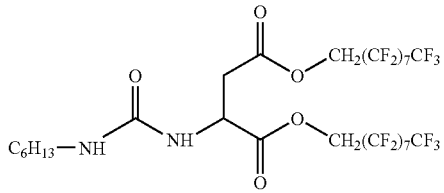
G-7

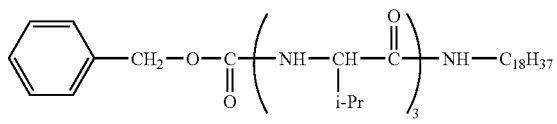
G-8

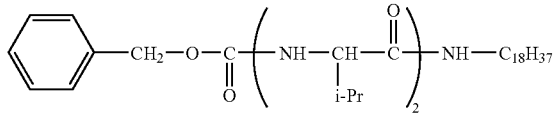
G-9

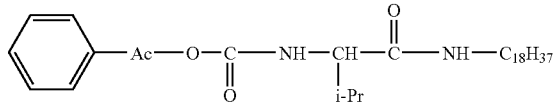
G-10

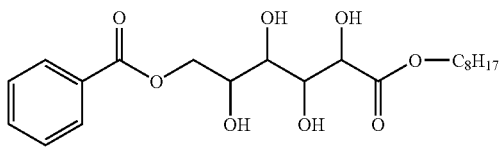
G-11

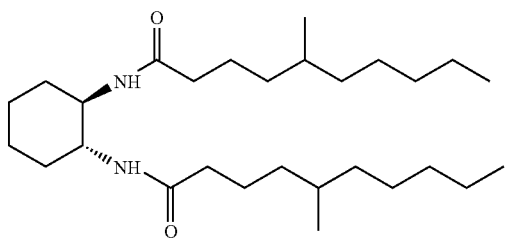
G-12

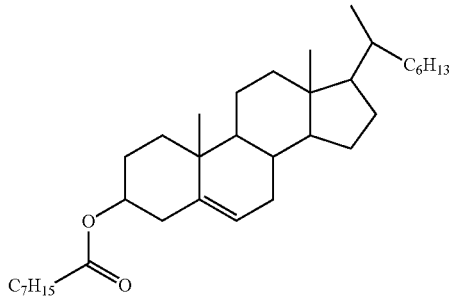
G-13

Among the above-mentioned specific examples of the low molecular weight gelling agent, G-4, G-7, G12 and G-13 having no aromatic groups are favorable, and G-4 is particularly favorable.

The low molecular weight gelling agent according to the invention can be synthesized according to the method described in J. Mater. Chem., Vol. 12, p 2197-2201, 2002.

(Host Liquid Crystal)

The host liquid crystal which can be used for the liquid crystal display element and light-modulating material of the invention is defined as a compound that is able to change its orientation state by the action of the electric field, and has a function for controlling orientation state of the dichroic dye represented by formula (1).

The host liquid crystal which can be used in the invention is not particularly restricted so long as it is compatible with the dichroic dye. Examples of the liquid crystal compound which can be used in the invention include those exhibits a nematic phase or a smectic phase. The nematic liquid crystal compounds are preferable among the liquid crystal compounds from the viewpoints of a high response rate and low driving voltage.

Specific examples of nematic liquid crystal compounds include azomethine compounds, cyanobiphenyl compounds, cyanophenyl esters, fluorine-substituted phenyl esters, cyclohexanecarboxylic acid phenyl esters, fluorine-substituted cyclohexanecarboxylic acid phenyl ester, cyanophenylcyclohexane, fluoro-substituted phenylcyclohexane, cyano-substituted phenylpyrimidine, fluorine-substituted phenylpyrimidine, alkoxy-substituted phenylpyrimidine, fluorine-substituted and alkoxy-substituted phenylpyrimidine, phenyldioxane, tolan type compounds, fluorine-substituted tolan type compounds, and alkenylcyclohexylbenzonitrile. Also, liquid crystalline compounds described in Liquid Crystal Device Handbook, pp. 154-192 and pp. 715-722, edited by No. 142 Committee of Japan Society for the Promotion of Science, published by Nikkan Kogyo Shimbum (1989) are usable. The host liquid crystals substituted by fluorines are usable, and those host liquid crystals are suitable for TFT driving. Further, liquid crystals manufactured by Merck (e.g., ZLI-4692, MLC-6267, 6284, 6287, 6288, 6406, 6422, 6423, 6425, 6435, 6437, 7700, 7800, 9000, 9100, 9200, 9300, and 10000) and liquid crystals manufactured by Chisso Corp. (e.g., LIXON 5036xx, 5037xx, 5039xx, 5040xx, and 5041xx) can be used.

Dielectric anisotropy of the host liquid crystal used in the invention may be positive or negative. When the host liquid crystal having a positive dielectric anisotropy is horizontally oriented, the liquid crystal absorbs a light when no voltage is applied, since the liquid crystal is horizontally oriented and thus the dichroic dye is also horizontally oriented. On the other hand, the dichroic dye is tilted toward a vertical direction by applying a voltage since the liquid crystal molecule is tilted toward a vertical direction, and as a result, the liquid crystal becomes to transmit the light. In other words, the liquid crystal is in a normally white mode when a voltage is applied, while the liquid crystal is in a normally black mode when the voltage is not applied.

When the host liquid crystal having negative dielectric anisotropy is vertically oriented, the light is transmitted without being absorbed when no voltage is applied, since the liquid crystal is vertically oriented and thus the dichroic dye is also vertically oriented. On the other hand, the dichroic dye is tilted toward the horizontal direction by applying a voltage since the liquid crystal molecule is tilted toward the horizontal direction, and as a result, the liquid crystal absorbs the light. In other words, the liquid crystal is in a normally white mode when no voltage is applied, while the liquid crystal is in a normally black mode when a voltage is applied.

The liquid crystal molecule preferably has a structure having large dielectric anisotropy in a minor axis direction in order to permit the liquid crystal to have negative dielectric anisotropy. Examples of such liquid crystal molecule include those described in Monthly Journal of Display, p 4-9, April, 2000 and in Syn. Lett., Vol 4, p 389-396, 1999. Among these examples, liquid crystal molecules having a fluorine based substituent and negative dielectric anisotropy are preferable from the view point of voltage retention ratio. Examples of such liquid crystal include those manufactured by Merck (trade names: MCL-6608, 6609, 6610 and the like).

Larger anisotropy of the refractive index ($\Delta n$) of the host liquid crystal used in the invention is preferable for enhancing scattering intensity, and $\Delta n$ of 0.1 or more is favorable. Anisotropy of the refractive index ($\Delta n$) as used herein is defined as a difference between the refractive index in the major axis direction (n||) of the liquid crystal molecule and the refractive index in the minor axis direction (n⊥) of the liquid crystal molecule.

$$\Delta n = n|| - n\perp$$

Accordingly, the host liquid crystal having large $\Delta n$ preferably has a partial structure with a large refractive index in the major axis direction of the molecule.

Compounds that exhibit no liquid crystalline property may be added to the liquid crystal composition in order to change the properties of the host liquid crystal within a desired range (for example, in order to adjust the temperature range of the liquid crystal phase within a desired range). Other molecules such as a chiral compound, a UV absorbing agent and an antioxidant may be added to the liquid crystal composition. Examples of such additives are chiral agents for TN and STN liquid crystals described in Liquid Crystal Device Handbook (edited by Japan Society for the Promotion of Science 142th Committee, p 199-202, published by THE NIKKAN KOGYO SHIMBUN, LTD., 1989).

(Composition of Liquid Crystal Layer)

While the contents of the host liquid crystal, low molecular weight gelling agent and dichroic dye are not particularly restricted, the content of the dichroic dye is preferably 0.1 to 15% by mass, more preferably 0.5 to 6% by mass, and further preferably 1.0 to 5% by mass relative to the content of the host liquid crystal, when the dichroic dye is used for either the liquid crystal display element or the light-modulating material. In an embodiment of the liquid crystal display element, the content of the dichroic dye may be 0.3 to 5% by mass relative to the content of the host liquid crystal. In an embodiment of the light-modulating material, the content of the dichroic dye may be 0.5 to 10% by mass relative to the content of the host liquid crystal.

The contents of the host liquid crystal and dichroic dye are desirably determined so that a dye concentration necessary for exhibiting a desired optical density of the liquid crystal cell is obtained by preparing the liquid crystal composition containing the host liquid crystal and dichroic dye, and by measuring an absorption spectrum of the liquid crystal cell in which the liquid crystal composition is contained and sealed.

The content of the low molecular weight gelling agent is preferably determined so that the scattering intensity is high, changes of orientation of the host liquid crystal is not impaired, and stainability by the dichroic dye is small. While the content of the low molecular weight gelling agent is different depending on the kind of the low molecular weight gelling agent and combination with the host liquid crystal, the content is preferably in the range of about 0.1 to about 5% by mass, more preferably about 0.2 to 3% by mass relative to the total mass of the liquid crystal composition.

It is particularly favorable for allowing the liquid crystal display element to attain a high reflectance in a bright display image mode that the amount of addition of the low molecular weight gelling agent is in the range of 0.2 to 1.0% by mass.

It is particularly favorable for allowing the light-modulating material to exhibit high scattering intensity and high transmittance in a transparent state that the amount of addition of the low molecular weight gelling agent is in the range of 0.5 to 1.5% by mass.

It is also favorable for both the liquid crystal display element and light-modulating material to use the host liquid crystal having $\Delta n$ of 0.1 or more in order to obtain good light scattering in a colored state from the view point of enhancing the scattering intensity by increasing the difference of refractive index from the refractive index of the network of the low molecular weight gelling agent as a result of changes of orientation of the host liquid crystal.

Regarding the light-modulation performance, the light-modulating material of the invention preferably has a ratio ($T_0/T$) of transmittance T of the light in a colored state and transmittance $T_0$ in a transparent state in the range of 3 to 1000, preferably 5 to 1000, particularly preferably 8 to 1000, represented by.

A plurality of dichroic dyes may be mixed in one liquid crystal layer in the liquid crystal display element and light-modulating material of the invention. Any colors may be displayed.

Liquid crystal layers colored with respective colors may be laminated as different layers, or the liquid crystal layers (liquid crystal parts) colored with respective colors may be aligned in parallel.

<Structure of Liquid Crystal Display Element and Light-modulating Material>

(Basic Structure)

The liquid crystal display element includes a liquid crystal layer between a pair of electrode substrates at least one of which is a transparent electrode substrate. The liquid crystal layer is formed by allowing the pair of the electrode substrates to face with each other via, for example, a spacer, so as to have a certain distance, and by injecting a liquid crystal composition containing a host liquid crystal, a low molecular weight gelling agent and a dichroic dye into the space between the substrates. The liquid crystal display element preferably includes a white scattering layer disposed on the substrate that is not the substrate of an observation surface side in order to enhance reflectivity in the bright display mode.

The light-modulating material may include at least a liquid crystal layer containing a host liquid crystal and a dichroic dye. Accordingly, in an embodiment of the light-modulating material, the liquid crystal layer may be disposed between a pair of supports, or in another embodiment of the light-modulating material, the liquid crystal layer may be disposed between a pair of electrode substrates in order to electrically control the light-modulation state. The support and substrates are preferably transparent.

The method for providing the liquid crystal layer between the supports or substrates is the same as the method for providing the liquid crystal layer in the liquid crystal display element.

An organic interlayer insulation film, a metal reflection plate, a phase difference plate, an orientation film, a light scattering plate, a reflection preventive layer, a UV absorbing layer and a barrier layer may be further provided in the liquid crystal display element and light-modulating material. One of these layers may be used alone, or two or more of them may be used together.

(Constituting Members)
—Electrode Substrate—

As the electrode substrate, those including an electrode layer formed on a substrate made of a glass or plastic may be usually used. Examples of the plastic substrate include acrylic resin, polycarbonate resin, epoxy resin, PES resin and PEN resin. Examples of the substrate which can be used include those described in p 218-231 of "Liquid Crystal Device Handbook", edited by Japan Society for the Promotion of Science 142th Committee, published by THE NIKKAN KOGYO SHIMBUN, LTD., 1989.

The electrode layer formed on the substrate is preferably a transparent electrode layer, and may be formed from, for example, indium oxide, indium tin oxide (ITO) or tin oxide. As the transparent electrode, for example, those described in p 232-239 of "Liquid Crystal Device Handbook", edited by Japan Society for the Promotion of Science 142th Committee, published by THE NIKKAN KOGYO SHIMBUN, LTD., 1989 may be used.

—Spacer—

The light-modulating material and liquid crystal display element of the invention can be manufactured, for example, by allowing a pair of substrates to face each other via, for example, a spacer, with a distance of 1 to 50 µm, and by disposing the liquid crystal composition in the space formed between the substrates.

In the liquid crystal display element of the invention, the thickness of the liquid crystal layer, or the distance between the substrates formed by the spacer is preferably 1 to 50 µm, more preferably 2 to 30 µm. It may be difficult to obtain high reflectance in the bright display mode when the distance is larger than 50 µm, while a distance of smaller than 1 µm is not preferable since uneven display images may tend to appear by an electric current due to partial defects in the liquid crystal layer.

In the light-modulating material of the invention, the thickness of the liquid crystal layer, or the distance between the substrates formed by the spacer is preferably 1 to 50 µm, more preferably 5 to 30 µm. Transmittance in the transparent state may tend to be decreased when the thickness is larger than 50 µm, while a thickness of smaller than 1 µm is not preferable since uneven display images may tend to appear by an electric current due to partial defects in the liquid crystal layer.

As the spacer, those described in p 257-262 of "Liquid Crystal Device Handbook", edited by Japan Society for the Promotion of Science 142th Committee, published by THE NIKKAN KOGYO SHIMBUN, LTD., 1989 may be used. The liquid crystal composition of the invention can be disposed in the space between the substrates by coating or printing on the substrate.

(Driving Method)

The liquid crystal display element and light-modulating material (light-modulating element) of the invention can be driven using a passive matrix driving method or an active matrix driving method using a thin film transistor (TFT). The passive matrix driving method is preferable from the view point of manufacturing the element with a low cost, while the active matrix driving method is preferable from the view point of enabling high quality display. As the driving method of the liquid crystal display element of the invention, for example, the driving methods described in p 387-460 of "Liquid Crystal Device Handbook", edited by Japan Society for the Promotion of Science 142th Committee, published by THE NIKKAN KOGYO SHIMBUN, LTD., 1989, may be used. In particular, as the dual frequency driving method in the passive matrix method, the methods described in JP-A Nos. 54-84995, 61-16988 and 2002-149130 can be used.

(Use)

The liquid crystal display element and light-modulating material of the invention are able to give high display performance with excellent visibility, and can be simply manufactured. Accordingly, the liquid crystal display element and light-modulating material of the invention may be favorably used in the light-modulating element, a point card as a rewritable display medium, a temporarily used document and an image display medium.

EXAMPLES

The invention will be described in more detail hereinafter with reference to examples. The materials, reagents, quantities of substances and proportions thereof and operations may be appropriately changed unless they do not depart from the spirit of the invention. Accordingly, the scope of the invention is not restricted by the examples as set forth below.

Example 1

<Preparation of Light-Modulating Material (Light-Modulating Element)>

1. Manufacture of Dichroic Dye and Liquid Crystal

Dichroic dyes (1-2) and (1-8) were synthesized according to the methods described in JP-A No. 2003-192664. Dichroic dye (1-13) was synthesized according to the methods described in JP-A No. 2005-120334. Low molecular weight gelling agent G-1 was synthesized according to the method described in J. Mater. Chem. Vol. 12, p 2197-2201, 2002. Host liquid crystal ZLI-1132 (trade name) was purchased from Merck.

2. Manufacture of Light-Modulating Element

A horizontally oriented polyimide film (manufactured by NISSAN CHEMICAL INDUSTRIES, LTD.) was provided on a glass substrate with ITO as a transparent electrode by spin coating and baking. Thus obtained glass substrate with the horizontally oriented film was subjected to rubbing treatment.

After dissolving the dichroic dye and low molecular weight gelling agent shown in Table 1 below in a host liquid crystal (ZLI-1132 ($\Delta n=0.13$)) with heating in a combination shown in Table 2, the mixture was allowed to stand for 1 day at room temperature to prepare a liquid crystal composition. The amount of addition of each dichroic dye was adjusted so that the absorbance is 0.8 when the liquid crystal composition is injected into an evaluation cell with a thickness of 8 µm. The low molecular weight gelling agent was added in a proportion shown in Table 2 relative to the total amount of the liquid crystal composition.

A small amount of spherical spacer (manufactured by SEKISUI CHEMICAL CO., LTD) with a diameter of 8 μm were mixed with the liquid crystal composition, and the mixture was put between the glass substrates with ITO so that the oriented film side of the substrates contact the liquid crystal layer. The product was sealed with a photo-curable sealing agent (manufactured by SEKISUI CHEMICAL CO., LTD. In the sample thus obtained, coloring of with each dichroic dye was observed with scattering of the light.

TABLE 1

| No. of Dichroic Dye | Comment |
| --- | --- |
| 1-8 | Magenta Dye |
| 1-13 | Cyan Dye |
| 1-2 | Yellow Dye |

3. Evaluation

The liquid layer became transparent when a voltage (20 V, 60 Hz) was applied to the light-modulating material (light-modulating element) of the invention using a signal generator (manufactured by Techtronix), and it was confirmed that the light-modulating material (light-modulating element) of the invention is able to electrically control the scattered colored state and transparent state. UV/Vis spectra at the scattered colored state and transparent state were measured at the maximum absorption wavelength of the dichroic dye using a spectrophotometer (trade name: UV2400, manufactured by Shimadzu Corp.) to measure the transmittance at the scattered colored state and transparent state, and the ratio (transmittance $T_0$ at transparent sate/transmittance T at scattered colored state) was evaluated.

It was confirmed from visual observation of the degree of scattering when no voltage is applied that a high light-modulating function can be obtained by combining the dichroic dye having a specific substituent and the low molecular weight gelling agent of the invention.

Comparative Example 1

<Preparation of Comparative Light-Modulating Material (Light-Modulating Element)>

The light-modulating element was manufactured by the same method as in Example 1, except that yellow dye Y-1, magenta dye M-1 and cyan dye C-1 shown below were used, and was evaluated in the same manner as in Example 1. The results of evaluation are shown in Table 2. The result showed that the light-modulating function of the light-modulating element in the comparative examples is lower than the light-modulating of the invention, since the light-modulating elements of the comparative examples have a low ratio of transmittance with weak intensity of scattering.

Comparative Example 1

Conventional compounds described in Jpn. Appl. Phys. Vol. 37, p 3422, 1998

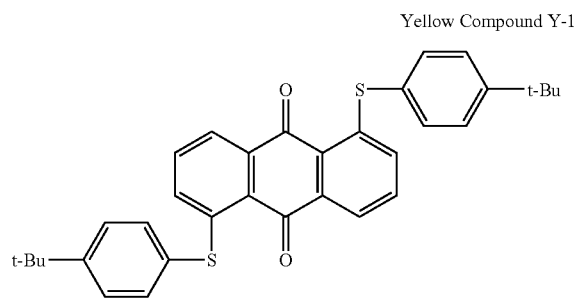

Yellow Compound Y-1

TABLE 2

| Sample | Dichroic Dye No. | Low Molecular Weight Gelling Agent | Content of Low Molecular Weight Gelling Agent | Transmittance Ratio | Intensity of Scattering | Note |
| --- | --- | --- | --- | --- | --- | --- |
| A | 1-8 | G-1 | 1.0% by mass | 4.0 | Strong | Example |
| B | 1-8 | G-1 | 0.5% by mass | 3.8 | Strong | Example |
| C | 1-8 | G-1 | 1.5% by mass | 3.5 | Strong | Example |
| D | 1-8 | G-3 | 1.0% by mass | 3.5 | Strong | Example |
| E | 1-8 | G-4 | 0.5% by mass | 4.0 | Strong | Example |
| F | 1-8 | G-4 | 1.0% by mass | 4.2 | Strong | Example |
| G | 1-8 | G-4 | 1.5% by mass | 4.1 | Strong | Example |
| H | 1-13 | G-4 | 1.0% by mass | 4.7 | Strong | Example |
| I | 1-2 | G-4 | 1.0% by mass | 4.5 | Strong | Example |
| J | Y-1 | G-4 | 1.0% by mass | 1.8 | Moderate | Comparative Example |
| K | Y-1 | G-1 | 1.0% by mass | 1.4 | Weak | Comparative Example |
| L | M-1 | G-4 | 1.0% by mass | 1.6 | Moderate | Comparative Example |
| M | C-1 | G-4 | 1.0% by mass | 1.8 | Moderate | Comparative Example |

-continued

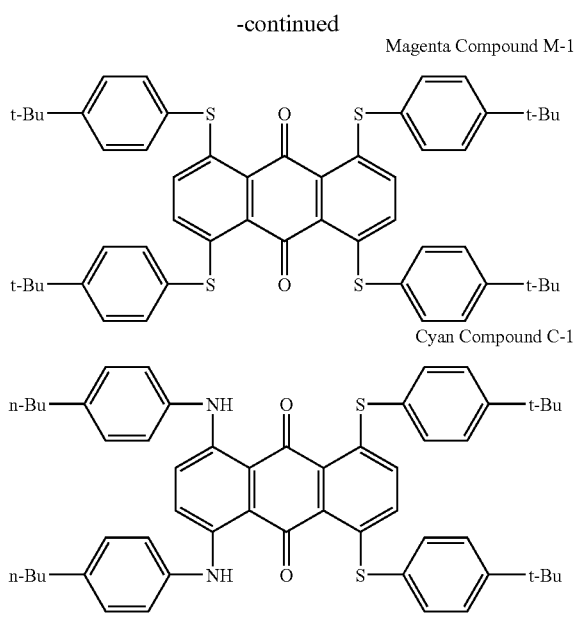

Magenta Compound M-1

Cyan Compound C-1

Comparative Example 2

A light-modulating material using gelatin as a comparative polymer gelling agent was manufactured by the following procedure. After dispersing the liquid crystal composition (70% by mass relative to gelatin) containing dichroic dye 1-8 and host liquid crystal ZLI-1132 with a homogenizer, a small quantity of spherical spacer with a diameter of 8 μm was added to the homogenized mixture. The mixture was coated on a glass substrate with ITO and dried to prepare the light-modulating material by the same procedure as in Example 1. When a voltage (20 V, 60 Hz) was applied to the light-modulating material obtained using a signal generator (manufactured by Techtronix), the colored state was only slightly decolorized and was shown not to function as a light-modulating material. In other words, a higher driving voltage was necessary when the polymer gelling agent is used.

Example 2

<Preparation of Light-Modulating Material (Light-Modulating Element)>

1. Manufacture of Plastic Substrate

An undercoat layer and a back layer were formed on PEN (trade name: Q65A, manufactured by Dupont-Teijin) by the same method as manufacturing sample 110 in Example 1 in JP-A No. 2000-105445. After drying 100 parts by weight of polyethylene-2,6-naphthalate polymer and 2 parts by weight of TINUVIN P326 (trade name, manufactured by Ciba-Geigy), the mixture was melted at 300° C. and extruded from a T-die. A plastic substrate (PEN) with a thickness of 90 μm was obtained by longitudinally drawing the molten mixture 3.3 times at 140° C. followed by 3.3 times of lateral drawing at 130° C., and by thermosetting at 250° C. for 6 seconds.

2. Preparation of Transparent Electrode Layer

Conductive indium tin oxide was coated on one surface of the plastic substrate obtained above, and a uniform thin film with a thickness of 200 nm was laminated on the substrate. The conductive layer had an area resistivity of 20 $\Omega/cm^2$ and a transmittance (at a wavelength of 500 nm) of 85%. The indium tin oxide thin film was patterned into stripes (with a width of 100 μm and a gap having a width of 10 μm) to form a transparent electrode layer.

(Preparation of Guest-Host Liquid Crystal Layer)

The light-modulating element of the invention was manufactured by the same procedure as in Example 1 except that the above-mentioned support was used, E-7 (trade name, manufactured by Merck.; Δn=0.22) was used as the host liquid crystal and a cell gap was 16 μm.

(Preparation of Barrier Layer: Preparation of Organic-Inorganic Hybrid Layer)

SOANOL D2908 (8 g; trade name of ethylene-vinyl alcohol copolymer, manufactured by Nippon Synthetic Chemical Industry Co., Ltd.) was dissolved in a mixed solvent of 118.8 g of 1-propanol and 73.2 g of water at 80° C. 2N hydrochloric acid (2.4 ml) was added to this solution and mixed. Tetraethoxysilane (1 g) was dripped to this solution with stirring for 30 minutes.

The coating solution obtained was applied on the support of the light-modulating element with a wire bar. An organic-inorganic hybrid layer with a thickness of about 1 μm was formed in the light-modulating element by drying at 120° C. for 5 minutes.

(Preparation of UV Absorbing Layer)

After mixing 42 g of water, 40 g of silanol-modified polyvinyl alcohol (trade name: R1205, manufactured by KURARAY CO., LTD) and 13.5 g of UV filter capsule liquid, 17 g of an aqueous solution of 2-(3-t-butyl-5-methyl-2-hydroxyphenyl)-5-chlorobenzotriazole with a concentration of 50% by mass, 65 g of a colloidal silica dispersion (trade name: SNOWTEX O, manufactured by Nissan Chemical Industries, Ltd.) with a concentration of 20% by mass, 2.5 g of polyoxyethylene alkylether phosphate (trade name: NEOSCOA CM57, manufactured by Toho Chemical Industries Co., Ltd.) and 2.5 g of polyethyleneglycol dodecylether (trade name: EMULGEN 109P, manufactured by Kao Corp.) were mixed to obtain a UV filter layer coating liquid.

The coating liquid obtained was applied on the barrier layer of the light-modulating element with a wire bar, and a UV absorbing layer with a thickness of about 1 μm was formed by drying the applied layer at 120° C. for 5 minutes.

3. Evaluation of Display Performance

The light-modulating element of the invention obtained was evaluated as in Example 1, and it was confirmed that light-modulation with a high contrast ratio was possible as shown in Table 3.

TABLE 3

| Sample | Dichroic Dye No. | Low Molecular Weight Gelling Agent | Content of Low Molecular Weight Gelling Agent | Transmittance Ratio | Intensity of Scattering | Note |
|---|---|---|---|---|---|---|
| N | 1-2 | G-4 | 1.0% by mass | 8.0 | Strong | Example |
| O | 1-8 | G-4 | 0.5% by mass | 8.2 | Strong | Example |
| P | 1-13 | G-4 | 1.5% by mass | 10.3 | Strong | Example |

TABLE 3-continued

| Sample | Dichroic Dye No. | Low Molecular Weight Gelling Agent | Content of Low Molecular Weight Gelling Agent | Transmittance Ratio | Intensity of Scattering | Note |
|---|---|---|---|---|---|---|
| Q | Y-1 | G-4 | 1.0% by mass | 2.5 | Weak | Comparative Example |
| R | M-1 | G-4 | 0.5% by mass | 2.8 | Moderate | Comparative Example |
| S | C-1 | G-4 | 1.0% by mass | 3.9 | Moderate | Comparative Example |

Example 3

<Manufacture of Liquid Crystal Display Element>

A liquid crystal display element was manufactured by inserting a liquid crystal layer between glass substrates with ITO by the same procedure as in Example 1. A coating liquid, which was prepared by dispersing a white pigment of titanium oxide subjected to surface treatment for eliminating surface activity together with 5% by mass of carboxycellulose, was applied as a white scattering layer on the surface of the glass substrate, the surface which was not in contact with the liquid crystal.

(Evaluation of Display Performance)

The liquid crystal layer turned into a transparent or white display state when a voltage (20 V, 60 Hz) was applied to the liquid crystal display element of the invention thus obtained using a signal generator (manufactured by Techtronix). No polarizer was necessary for the liquid crystal display element of the invention, and the liquid crystal display element was confirmed to be a bright liquid crystal display element that is excellent in visibility with white scattering background resembling to a paper sheet.

In the following, exemplary embodiments of the invention will be described. However, the invention is not limited to the following exemplary embodiments.

[1] A liquid crystal display element that is a layered member comprising: a liquid crystal layer, provided between a pair of electrodes, at least one of which being a transparent electrode, the liquid crystal layer including at least one low molecular weight gelling agent, at least one dichroic dye having a substituent represented by formula (1) and at least one host liquid crystal; and a reflection layer; the liquid crystal display element displaying an image by reflecting incident light

  Formula (1)

wherein, in formula (1), Het represents an oxygen atom or a sulfur atom; $B^1$ and $B^2$ each independently represent a divalent arylene group, a heteroarylene group or a divalent alicyclic hydrocarbon group; $Q^1$ represents a divalent linking group; $C^1$ represents an alkyl group, a cycloalkyl group, an alkoxy group, an alkoxycarbonyl group, an acyl group or an acyloxy group; j represents 0 or 1; p, q and r each independently represent an integer of 0 to 5; n represents an integer of 1 to 3; (p+r)×n is an integer of 3 to 10; when p is 2 or larger, two or more groups represented by $B^1$ may be the same or different; when q is 2 or larger, two or more groups represented by $Q^1$ may be the same or different; when r is 2 or larger, two or more groups represented by $B^2$ may be the same or different; and when n is 2 or larger, two or more groups represented by $[(B^1)_p\text{-}(Q^1)_q\text{-}(B^2)_r]$ may be the same or different.

[2] The liquid crystal display element as described in [1], wherein the low molecular weight gelling agent includes at least two hydrogen-bonding groups.

[3] The liquid crystal display element as described in [1] or [2], wherein the low molecular weight gelling agent includes at least two amide groups.

[4] The liquid crystal display element as described in any one of [1] to [3], wherein the low molecular weight gelling agent includes no aromatic groups.

[5] The liquid crystal display element as described in any one of [1] to [4], wherein at least one of the dichroic dye(s) is a compound represented by formula (2):

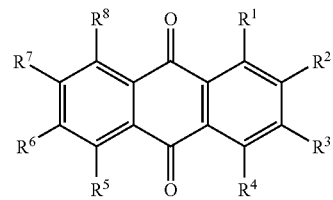

Formula (2)

wherein, in formula (2), at least one of $R^1$, $R^2$, $R^3$, $R^4$, $R^5$, $R^6$, $R^7$ and $R^8$ is represented by -(Het)$^j$-[(B$^1$)$_p$-(Q$^1$)$_q$-(B$^2$)$_r$]$_n$-C$^1$ and the remaining groups each independently represent a hydrogen atom or a substituent; Het represents an oxygen atom or a sulfur atom; $B^1$ and $B^2$ each independently represent an arylene group, a heteroarylene group or a divalent alicyclic hydrocarbon group; $Q^1$ represents a divalent linking group; $C^1$ represents an alkyl group, a cycloalkyl group, an alkoxy group, an alkoxycarbonyl group, an acyl group or an acyloxy group; j represents 0 or 1; p, q and r each independently represent an integer of 0 to 5; n represents an integer of 1 to 3; (p+r)×n is an integer of 3 to 10; when p is 2 or larger, two or more groups represented by $B^1$ may be the same or different; when q is 2 or larger, two or more groups represented by $Q^1$ may be the same or different; when r is 2 or larger, two or more groups represented by $B^2$ may be the same or different; and when n is 2 or larger, two or more groups represented by $[(B^1)_p\text{-}(Q^1)_q\text{-}(B^2)_r]$ may be the same or different.

[6] The liquid crystal display element as described in any one of [1] to [5], wherein at least one of the dichroic dye(s) is a compound represented by formula (3):

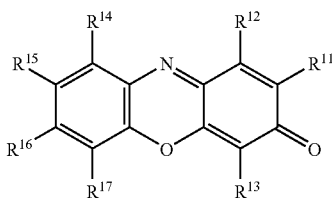

Formula (3)

wherein, in formula (3), at least one of $R^{11}$, $R^{12}$, $R^{13}$, $R^{14}$, $R^{15}$, $R^{16}$ and $R^{17}$ is represented by -(Het)$_j$-[(B$^1$)$_p$-(Q$^1$)$_q$-(B$^2$)$_r$]$_n$-C$^1$ and the remaining groups each independently represent a hydrogen atom or a substituent; Het represents an oxygen atom or a sulfur atom; B$^1$ and B$^2$ each independently represent an arylene group, a heteroarylene group or a divalent alicyclic hydrocarbon group; Q$^1$ represents a divalent linking group; C$^1$ represents an alkyl group, a cycloalkyl group, an alkoxy group, an alkoxycarbonyl group, an acyl group or an acyloxy group; j represents 0 or 1; p, q and r each independently represent an integer of 0 to 5; n represents an integer of 1 to 3; (p+r)×n is an integer of 3 to 10; when p is 2 or larger, two or more groups represented by B$^1$ may be the same or different; when q is 2 or larger, two or more groups represented by Q$^1$ may be the same or different; when r is 2 or larger, two or more groups represented by B$^2$ may be the same or different; and when n is 2 or larger, two or more groups represented by [(B$^1$)$_p$-(Q$^1$)$_q$-(B$^2$)$_r$] may be the same or different.

[7] The liquid crystal display element as described in any one of [1] to [6], wherein the content of the low molecular weight gelling agent is 0.1% by mass to 5% by mass relative to the total mass of liquid crystal composition constituting the liquid crystal layer.

[8] The liquid crystal display element as described in any one of [1] to [7], wherein the content of the dichroic dye(s) is 0.3% by mass to 5% by mass relative to the content of the host liquid crystal.

[9] The liquid crystal display element as described in any one of [1] to [8] further comprising a white scattering layer.

[10] A light-modulating material including at least one low molecular weight gelling agent, at least one dichroic dye including a substituent represented by formula (1) and at least one host liquid crystal, the light-modulating material transmitting incident light and changing the transmittance thereof:

-(Het)$_j$-[(B$^1$)$_p$-(Q$^1$)$_q$-(B$^2$)$_r$]$_n$-C$^1$    Formula (1)

wherein, in formula (1), Het represents an oxygen atom or a sulfur atom; B$^1$ and B$^2$ each independently represent a divalent arylene group, a heteroarylene group or a divalent alicyclic hydrocarbon group; Q$^1$ represents a divalent linking group; C$^1$ represents an alkyl group, a cycloalkyl group, an alkoxy group, an alkoxycarbonyl group, an acyl group or an acyloxy group; j represents 0 or 1; p, q and r each independently represent an integer of 0 to 5; n represents an integer of 1 to 3; (p+r)×n is an integer of 3 to 10; when p is 2 or larger, two or more groups represented by B$^1$ may be the same or different; when q is 2 or larger, two or more groups represented by Q$^1$ may be the same or different; when r is 2 or larger, two or more groups represented by B$^2$ may be the same or different; and when n is 2 or larger, two or more groups represented by [(B$^1$)$_p$-(Q$^1$)$_q$-(B$^2$)$_r$] may be the same or different.

[11] The light-modulating material as described in [10], wherein the low molecular weight gelling agent includes at least two hydrogen-bonding groups.

[12] The light-modulating material as described in [10] or [11], wherein the low molecular weight gelling agent includes at lease two amide groups.

[13] The light-modulating material as described in any one of [10] to [12], wherein the low molecular weight gelling agent includes no aromatic groups.

[14] The light-modulating material as described in any one of [10] to [13] having a light transmittance ratio ($T_0$/T) in the range of 3 to 1000, wherein T denotes transmittance of the light-modulating material in a colored state and $T_0$ represents transmittance of the light-modulating material in a transparent state.

[15] The light-modulating material as described in any one of [10] to [14], wherein at least one of the dichroic dye(s) is a compound represented by formula (2):

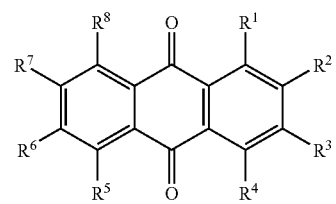

Formula (2)

wherein, in formula (2), at least one of $R^1$, $R^2$, $R^3$, $R^4$, $R^5$, $R^6$, $R^7$ and $R^8$ is represented by -(Het)$^j$-[(B$^1$)$_p$-(Q$^1$)$_q$-(B$^2$)$_r$]$_n$-C$^1$ and the remaining groups each independently represent a hydrogen atom or a substituent; Het represents an oxygen atom or a sulfur atom; B$^1$ and B$^2$ each independently represent an arylene group, a heteroarylene group or a divalent alicyclic hydrocarbon group; Q$^1$ represents a divalent linking group; C$^1$ represents an alkyl group, a cycloalkyl group, an alkoxy group, an alkoxycarbonyl group, an acyl group or an acyloxy group; j represents 0 or 1; p, q and r each independently represent an integer of 0 to 5; n represents an integer of 1 to 3; (p+r)×n is an integer of 3 to 10; when p is 2 or larger, two or more groups represented by B$^1$ may be the same or different; when q is 2 or larger, two or more groups represented by Q$^1$ may be the same or different; when r is 2 or larger, two or more groups represented by B$^2$ may be the same or different; and when n is 2 or larger, two or more groups represented by [(B$^1$)$_p$-(Q$^1$)$_q$-(B$^2$)$_r$] may be the same or different.

[16] The light-modulating material as described in any one of [10] to [15], wherein at least one of the dichroic dye(s) is a compound represented by formula (3):

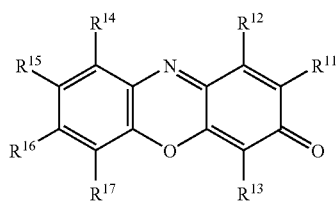

Formula (3)

wherein, in formula (3), at least one of $R^{11}$, $R^{12}$, $R^{13}$, $R^{14}$, $R^{15}$, $R^{16}$ and $R^{17}$ is represented by -(Het)$_j$-[(B$^1$)$_p$-(Q$^1$)$_q$-(B$^2$)$_r$]$_n$-C$^1$ and the remaining groups each independently represent a hydrogen atom or a substituent; Het represents an oxygen atom or a sulfur atom; B$^1$ and B$^2$ each independently represent an arylene group, a heteroarylene group or a divalent alicyclic hydrocarbon group; Q$^1$ represents a divalent linking group; $C^1$ represents an alkyl group, a cycloalkyl group, an alkoxy group, an alkoxycarbonyl group, an acyl group or an acyloxy group; j represents 0 or 1; p, q and r each independently represent an integer of 0 to 5; n represents an integer of 1 to 3; (p+r)×n is an integer of 3 to 10; when p is 2 or larger, two or more groups represented by $B^1$ may be the same or different; when q is 2 or larger, two or more groups represented by $Q^1$ may be the same or different; when r is 2 or larger, two or more groups represented by $B^2$ may be the same or different; and when n is 2 or larger, two or more groups represented by $[(B^1)_p\text{-}(Q^1)_q\text{-}(B^2)_r]$ may be the same or different.

[17] The light-modulating material as described in any one of [10] to [16], including a liquid crystal layer containing the low molecular weight gelling agent, the dichroic dye and the host liquid crystal, wherein the content of the low molecular weight gelling agent is 0.1% by mass to 5% by mass relative to the total mass of liquid crystal composition constituting the liquid crystal layer.

[18] The light-modulating material as described in any one of [10] to [17], including a liquid crystal layer containing the low molecular weight gelling agent, the dichroic dye and the host liquid crystal, wherein the content of the dichroic dye is 0.5% by mass to 10% by mass relative to the content of the host liquid crystal.

[19] The light-modulating material as described in any one of [10] to [18], including a pair of electrodes between which the low molecular weight gelling agent, the dichroic dye and the host liquid crystal are contained.

In the exemplary embodiments of [1] to [9] above, there is provided a liquid crystal display element having a high reflectance of a white background with an improved display contrast ratio by combining a dichroic dye having a specific structure, a low molecular weight gelling agent and a host liquid crystal.

In the exemplary embodiments of [10] to [19] above, there is provided a light-modulating material having high transmittance in a transparent state with improved light-modulating performance by combining a dichroic dye having a specific structure, a low molecular weight gelling agent and a host liquid crystal.

The invention provides a liquid crystal display element having high display performance and a light-modulating material having high light-modulating performance.

All publications, patent applications, and technical standards mentioned in this specification are herein incorporated by reference to the same extent as if each individual publication, patent application, or technical standard was specifically and individually indicated to be incorporated by reference.

What is claimed is:

1. A liquid crystal display element that is a layered member comprising: a liquid crystal layer, provided between a pair of electrodes, at least one of which is a transparent electrode, and the liquid crystal layer including at least one low molecular weight gelling agent, at least one dichroic dye having a substituent represented by formula (1) and at least one host liquid crystal; and a reflection layer; the liquid crystal display element displaying an image by reflecting incident light $$\text{-(Het)}_j\text{-}[(B^1)_p\text{-}(Q^1)_q\text{-}(B^2)_r]_n\text{-}C^1 \quad \text{Formula (1)}$$

wherein, in forumla (1), Het represents an oxygen atom or a sulfur atom; $B^1$ and $B^2$ each independently represent a divalent arylene group, a heteroarylene group or a divalent alicyclic hydrocarbon group; $Q^1$ represents a divalent linking group; $C^1$ represents an alkyl group, a cycloalky group, an alkoxy group, an alkoxycarbonyl group, an acyl group or an acyloxy group; j represents 0 or 1; p, q and r each independently represent an integer of to 0 to 5; n represents an integer of 1 to 3; (p+r)×n is an integer of 3 to 10; when p is 2 or larger, two or more groups represented by $B^1$ may be the same or different; when q is 2 or larger, two or more groups represented by $Q^1$ may be the same or different; when r is 2 or larger, two or more groups represented by $B^2$ may be the same or different; and when n is 2 or larger, two or more groups represented by $[(B^1)_p\text{-}(Q^1)_q\text{-}(B^2)_r]$ may be the same or different, the low molecular weight gelling agent having (i) a linear (per) fluoroalkyl group having 4 to 20 carbon atoms that may be substituted at a terminal, (ii) a linear alky group having 4 to 20 carbon atoms that may be substituted at another terminal, and (iii) at least two hydrogen-bonding groups.

2. The liquid crystal display element of claim 1, wherein the at least two hydrogen-bonding groups are at least two amide groups.

3. The liquid crystal display element of claim 1, wherein the low molecular weight gelling agent includes no aromatic groups.

4. The liquid crystal display element of claim 1, wherein at least one of the dichroic dye(s) is a compound represented by formula (2):

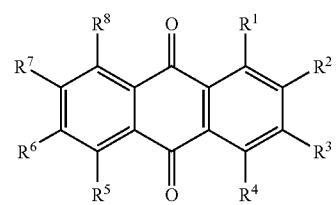

Formula (2)

wherein, in formula (2), at least one of $R^1$, $R^2$, $R^3$, $R^4$, $R^5$, $R^6$, $R^7$ and $R^8$ is represented by -(Het)$_j$-[(B$^1$)$_p$-(Q$^1$)$_q$-(B$_2$)$_r$] n-C$^1$ and the remaning groups each independently represents a hydrogen atom or a substituent; Het represents an oxygen atom or a sulfur atom; $B^1$ and $B^2$ each independently represent an arylene group, a heteroarylene group or a divalent alicyclic hydrocarbon group; $Q^1$ represents a divalent linking group; $C^1$ represents an alkyl group, a cycloalkyl group, an alkoxy group, an alkoxycarbonyl group, an acyl group or an acyloxy group; j represents 0 or 1; p, q and r each independently represent an integer of 0 to 5; n represents an integer of 1 to 3; (p+r)×n is an integer of 3 to 10; when p is 2 or larger, two or more groups represented by $B^1$ may be the same or different; when q is 2 or larger, two or more groups represented by $Q^1$ may be the same or different; when r is 2 or larger, two or more groups represented by $B^2$ may be the same or different; and when n is 2 or larger, two or more groups represented by $[(B^1)_p\text{-}(Q^1)_q\text{-}(B^2)_r]$ may be the same or different.

5. The liquid crystal display element of claim 1, wherein at least one of the dichroic dye(s) is a compound represented by formula (3):

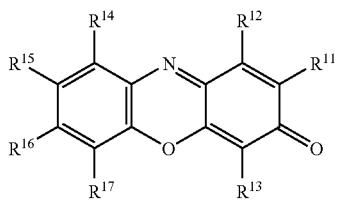

Formula (3)

wherein, in formula (3), at least one of $R^{11}$, $R^{12}$, $R^{13}$, $R^{14}$, $R^{15}$, $R^{16}$ and $R^{17}$ is represented by -(Het)$_j$-[(B$^1$)$_p$-(Q$^1$)$_q$-(B$^2$)$_r$]$_n$ -C$^1$ and the remaining, groups each independently represent a hydrogen atom or a substituent; Het represents an oxygen atom or a sulfur atom; B$^1$ and B$^2$ each independently represent an arylene group, a heteroarylene group or a divalent alicyclic hydrocarbon group; Q$^1$ represents a divalent linking group; C$^1$ represents an alkyl group, a cycloalky group, an alkoxy group, an alkoxycarbonyl group, an acyl group or an acyloxy group; j represents 0 or 1; p, q and r each independently represent an integer of 0 to 5; n represents an interger of 1 to 3; (p+r)×n is an integer of 3 to 10; when p is 2 or larger two or more groups represented by B$^1$ may be the same or different; when q is 2 or larger, two or more groups represented by Q$^1$ may be the same or different; when r is 2 or larger, two or more groups represented by B$^2$ may be the same or different; and when n is 2 or larger, two or more groups represented by [(B$^1$)$_p$-(Q$^1$)$_q$-(B$^2$)$_r$] may be the same or different.

6. The liquid crystal display element of claim 1, wherein the content of the low molecular weight gelling agent is 0.1% by mass to 5% by mass relative to the total mass of liquid crystal composition constituting the liquid crystal layer.

7. The liquid crystal display element of claim 1, wherein the content of the dichroic dye(s) is 0.3% by mass to 5% by mass relative to the content of the host liquid crystal.

8. The liquid crystal display element of claim 1 further comprising a white scattering layer.

9. A light modulating material comprising a liquid crystal layer, provided between a pair of electrodes and containing at least one low molecular weight gelling agent, at least one dichroic dye having a substituent represented by formula (1) and at least one host liquid crystal; the light-modulating material transmitting incident light and changing a transmittance thereof:

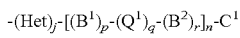

Formula (1)

wherein, in formula (1), Het represents an oxygen atom or a sulfur atom; B$^1$ and B$^2$ each independently represent a divalent arylene group, a heteroarylene group or a divalent alicylic hydrocarbon group; Q$^1$ represents a divalent linking group; C$^1$ represents an aklyl group, a cycloalkyl group, an alkoxy group, an alkoxycarbon group, an acyl group or an acyloxy group; j represents 0 or 1; p, q and r each independently represent an integer of 0 to 5; n represents an integer of 1 to 3; (p+r)×n is an integer of 3 to 10; when p is 2 or larger, two or more groups represented by B$^1$ may be the same or different; when q is 2 or larger, two or more groups represented by Q$^1$ may be the same or different; when r is 2 or larger, two or more groups represented by B$^2$ may be the same or different; and when n is 2 or larger, two or more groups represented by [(B$^1$)$_p$-(Q$^1$)$_q$-(B$^2$)$_r$] may be the same or different, the low molecular weight gelling agent having (i) a linear (per) fluoroalkyl group having 4 to 20 carbon atoms that may be substituted at a terminal, (ii) a linear alkyl group having 4 to 20 carbon atoms that may be substituted at another terminal, and (iii) at least two hydrogen-bonding groups.

10. The light-modulating material of claim 9, wherein the at least two hydrogen-bonding groups are at least two amide groups.

11. The light-modulating material of claim 9, wherein the low molecular weight gelling agent includes no aromatic groups.

12. The light-modulating material of claim 9 having a light transmittance ratio ($T_0/T$) in the range of 3 to 1000, wherein T denotes transmittance of the light-modulating material in a colored state and $T_0$ represents transmittance of the light-modulating material in a tranparent state.

13. The light-modulating material of claim 9, wherein at least one of the dichroic dye(s) is a compound represented by formula (2):

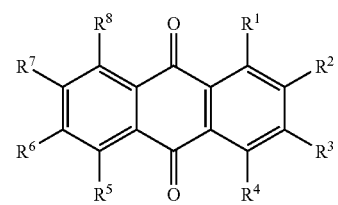

Formula (2)

wherein, in formula (2), at least one of $R^1$, $R^2$, $R^3$, $R^4$, $R^5$, $R^6$, $R^7$ and $R^8$ is represented by -(Het)$^j$-[(B$^1$)$_p$-(Q$^1$)$_q$-(B$^2$)$_r$]$_n$-C$^1$ and the remaining groups each independenly represent a hydrogen atom or a substituent; Het represents an oxygen atom or a sulfur atom; B$^1$ and B$^2$ each independently represent an arylene group, a heteroarylene group or a divalent alicylic hydrocarbon group; Q$^1$ represents a divalent linking group; C$^1$ represents an alkyl group, a cycloalky group, an alkoxy group, an alkoxycarbonyl group, an acyl group or an acyloxy group; j represents 0 or 1; p, q and r each independently represent an integer of 0 to 5; n represents an integer of 1 to 3; (p+r)×n is interger of 3 to 10; when p is 2 or larger, two or more groups represented by B$^1$ may be the same or different; when q is 2 or larger, two or more groups represented by Q$^1$ may be the same or different; when r is 2 or larger, two or more groups represented by B$^2$ may be the same or diffferent; and when n is 2 or larger, two or more groups represented by [(B$^1$)$_p$-(Q$^1$)$_q$-(B$^2$)$_r$] may be the same or different.

14. The light-modulating material of claim 9, wherein at least one of the dihroic dye(s) is a compound represented by formula (3):

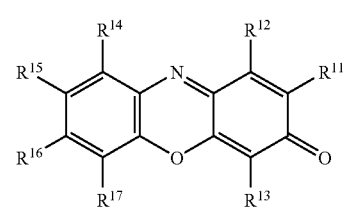

Formula (3)

wherein, in formula (3), at least one of $R^{11}$, $R^{12}$, $R^{13}$, $R^{14}$, $R^{15}$, $R^{16}$ and $R^{17}$ is represented by -(Het)$^j$-[$(B^1)_p$-$(Q^1)_q$-$(B^2)_r]_n$-$C^1$ and the remaining groups each independently represents a hydrogen atom or a substituent; Het represents an oxygen atom or a sulfur atom; $B^1$ and $B^2$ each independently represent, an arylene group, a heteroarylene group or a divalent alicyclic hydrocarbon group; $Q^1$ represents a divalent linking group; $C^1$ represents an alkyl group, a cycloalkyl group, an alkoxy group, an alkoxycarbonyl group, an acyl group or an acyloxy group; j represents 0 or 1; p, q and r each independently represent an integer of 0 to 5; n represents an integer of 1 to 3; (p+r)×n is an integer of 3 to 10; when p is 2 or larger, two or more groups represented by $B^1$ may be the same or diffrent; when n is 2 or larger, two or more groups represented by $Q^1$ may be the same or different; when r is 2 or larger, two or more groups represented by $B^2$ may be the same or different; and when n is 2 or larger, two or more groups represented by $[(B^1)_p$-$(Q^1)_q$-$(B^2)_r]$ may be the same or different.

15. The light-modulating material of claim 9, wherein the content of the low molecular weight gelling agent is 0.1% by mass to 5% by mass relative to the total mass of liquid crystal composition constititing the liquid crystal layer.

16. The light-modulating material of claim 9, wherein the content of the dichroic dye is 0.5% by mass to 10% by mass relative to the content of the host liquid crystal.

* * * * *